US009132775B2

(12) United States Patent
Ohama et al.

(10) Patent No.: US 9,132,775 B2
(45) Date of Patent: Sep. 15, 2015

(54) MOBILE OBJECT TARGET STATE DETERMINATION DEVICE AND PROGRAM

(75) Inventors: Yoshihiro Ohama, Nisshin (JP);
Tsukasa Shimizu, Aichi-gun (JP);
Shinichi Nagata, Yokohama (JP);
Takuya Kaminade, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 181 days.

(21) Appl. No.: 13/990,608

(22) PCT Filed: Nov. 21, 2011

(86) PCT No.: PCT/JP2011/076837
§ 371 (c)(1),
(2), (4) Date: Jul. 24, 2013

(87) PCT Pub. No.: WO2012/073745
PCT Pub. Date: Jun. 7, 2012

(65) Prior Publication Data
US 2013/0293395 A1    Nov. 7, 2013

(30) Foreign Application Priority Data
Nov. 30, 2010  (JP) .................... 2010-267551

(51) Int. Cl.
*G08G 1/16* (2006.01)
*B60Q 9/00* (2006.01)

(52) U.S. Cl.
CPC . *B60Q 9/008* (2013.01); *G08G 1/16* (2013.01)

(58) Field of Classification Search
CPC ......... G08G 1/16; G08G 1/166; B60Q 9/008; B60Q 9/00; B60R 21/0134
USPC ........ 340/903, 904, 435, 436; 701/1, 45, 300, 701/301; 342/107, 147, 70, 104
See application file for complete search history.

(56) References Cited

U.S. PATENT DOCUMENTS 7,194,347 B2    3/2007 Harumoto et al.
2005/0033516 A1*  2/2005 Kawasaki ..................... 701/301
(Continued)

FOREIGN PATENT DOCUMENTS

JP    2004-206207 A    7/2004
JP    2005-056372 A    3/2005
(Continued)

OTHER PUBLICATIONS

A. Broadhurst et al., "Monte Carlo Road Safety Reasoning," Proceedings of the IEEE Intelligent Vehicles Symposium 2005, Jun. 6-8, 2005, Las Vegas, Nevada, USA, pp. 319-324.

*Primary Examiner* — Hung T Nguyen
(74) *Attorney, Agent, or Firm* — Kenyon & Kenyon LLP

(57) ABSTRACT

An environmental movement detection section detects the speed of a vehicle and detects a mobile object in the vicinity of the vehicle. A collision probability prediction section predicts the probability of a prospective collision between the vehicle and the detected vicinity mobile object. On the basis of approach speeds, collision probabilities and sideward passing speeds when passing other mobile objects to sideward that have been determined from standard movements, a movement standard learning section learns relationships between approach speed, collision probability and sideward passing speed. On the basis of learning results at the movement standard learning section, a path characteristic point generation section determines a standard sideward passing speed for when passing the vicinity mobile object to sideward that corresponds with the detected approach speed and the predicted collision probability. Thus, standard mobile object states may be determined efficiently.

8 Claims, 23 Drawing Sheets

(56) References Cited

U.S. PATENT DOCUMENTS

| | | |
|---|---|---|
| 2008/0309468 A1* | 12/2008 | Greene et al. .............. 340/436 |
| 2009/0024357 A1* | 1/2009 | Aso et al. .................. 702/181 |
| 2009/0143987 A1* | 6/2009 | Bect et al. .................. 701/301 |
| 2009/0192710 A1* | 7/2009 | Eidehall et al. ............ 701/301 |
| 2010/0214155 A1* | 8/2010 | Harada ...................... 342/147 |

FOREIGN PATENT DOCUMENTS

| | | |
|---|---|---|
| JP | 2007-148917 A | 6/2007 |
| JP | 2009-087062 A | 4/2009 |
| JP | 2009-234442 A | 10/2009 |
| JP | 2009-244985 A | 10/2009 |
| JP | 2009-262702 A | 11/2009 |

* cited by examiner

FIG.3

| APPROACH SPEED (km/h) | SIDEWARD SPACING (m) | COLLISION PROBABILITY | SIDEWARD PASSING SPEED (km/h) |
|---|---|---|---|
| 60 | 0.5 | 0.62 | 15 |
| 60 | 1.0 | 0.79 | 28 |
| ... | ... | ... | ... |
| 20 | 3.0 | 0.95 | 20 |

FIG.7

| APPROACH SPEED (km/h) | FIRST-ORDER COEFFICIENT $\alpha$ | INTERCEPT $\beta$ |
|---|---|---|
| 60 | 107 | −54 |
| 50 | 86 | −40 |
| ... | ... | ... |
| 20 | 15 | 10 |

| CONNECTION WEIGHTING $w_{11}$ | CONNECTION WEIGHTING $w_{12}$ | ... | CONNECTION WEIGHTING $w_{31}$ |
|---|---|---|---|
| 1.5 | 3.4 | ... | 22 |

MOBILE OBJECT TARGET STATE DETERMINATION DEVICE AND PROGRAM

This is a 371 national phase application of PCT/JP2011/076837 filed 21 Nov. 2011, which claims priority to Japanese Patent Application No. 2010-267551 filed 30 Nov. 2010, the contents of which are incorporated herein by reference.

TECHNICAL FIELD

The present invention relates to a mobile object target state determination device and a program, and particularly relates to a mobile object target state determination device and program for determining a mobile object target state.

BACKGROUND ART

Heretofore, a driving support device has been known (see Japanese Patent Application Laid-Open (JP-A) No. 2007-148917) in which driving tendencies of a driver are parameterized, compared with the driving tendency parameters of (a) fellow vehicle occupant(s) during driving, and reported to the driver. Thus, the driving tendencies of the driver can be brought closer to those of the fellow vehicle occupant, leading to driving conditions that are comfortable for the fellow vehicle occupant. An object of this driving support device is to prompt changes in behavior of the driver by estimating parameters that encapsulate characteristics of the driver's driving operations from sensor information and reporting the estimated values to the driver.

A safe driving support device is known (JP-A No. 2009-262702) that expresses states of a driver driving a moving object as driving operations, senses an external environment and extracts characteristic quantities to identify environmental risks from the characteristic quantities, and, by associating the driving operations with the environmental risks, enables learning by a stochastic phase-switching model. After the learning, this safe driving support device inputs current driving operations and external environment characteristic quantities to the stochastic switching model. When environmental risks are high but driving operations are those that would be expected when risks are low, the safe driving support device determines that the driving operations are dangerous and generates driving support.

DISCLOSURE OF INVENTION

Technical Problem

However, in the technology recited in the above-mentioned JP-A No. 2007-148917, the estimated values are not characteristic points on a path likely to be subsequently followed by the vehicle but are statistical quantities from past behaviors by the fellow vehicle occupant (another person), and are reported without regard to collision possibilities from moment to moment.

Meanwhile, in the technology recited in JP-A No. 2009-262702, the emphasis is put on determining deviations from usual driving. While the environmental risks are considered as quantities, the characteristic quantities of driving operations reflect internal states of the driver and do not necessarily relate to movements of the vehicle. Therefore, movement standards are not specified and it is difficult to output what states the driver should be in from moment to moment.

The present invention has been made in order to solve the problems described above, and an object of the present invention is to provide a mobile object target state determination device and program capable of efficiently determining a target state of a mobile object.

Solution To Problem

A mobile object target state determination device according to a first aspect of the present invention for achieving the object described above includes: a detection section that detects a mobile object state that is at least one of a position, attitude state and movement state of a mobile object subject to a determination, and that detects a mobile object in a vicinity of the determination target mobile object; a collision prediction section that, on the basis of the mobile object state detected by the detection section, predicts a prospective collision probability between the determination target mobile object and the detected vicinity mobile object; and a determination section that determines a mobile object target state corresponding to the mobile object state detected by the detection section and the collision probability predicted by the collision prediction section, on the basis of a pre-specified relationship between the mobile object state, the collision probability and the mobile object target state.

A program according to a second aspect of the present invention causes a computer to function as: a collision prediction section that, on the basis of a mobile object state detected by a detection section that detects a mobile object state that is at least one of a position, attitude state and movement state of a mobile object subject to a determination and that detects a mobile object in a vicinity of the determination target mobile object, predicts a prospective collision probability between the determination target mobile object and the detected vicinity mobile object; and a determination section that determines a mobile object target state corresponding to the mobile object state detected by the detection section and the collision probability predicted by the collision prediction section, on the basis of a pre-specified relationship between the mobile object state, the collision probability and the mobile object target state.

According to the first aspect and the second aspect of the present invention, the detection section detects a mobile object state—at least one of a position, attitude state and movement state—of the determination target mobile object, and detects mobile objects in the vicinity of the determination target mobile object. On the basis of the mobile object state detected by the detection section, the collision prediction section predicts the probability of a prospective collision between the determination target mobile object and a detected vicinity mobile object.

Then, on the basis of pre-specified relationships between mobile object states, collision probabilities and mobile object target states, the determination section determines a mobile object target state corresponding to the mobile object state detected by the detection section and the collision probability predicted by the collision prediction section.

Thus, a mobile object state to be a target may be efficiently determined by determining the mobile object target state corresponding to the detected mobile object state and the predicted collision probability in accordance with the pre-specified relationships between mobile object states, collision probabilities and mobile object target states.

A mobile object target state determination device according to a third aspect of the present invention may further include a driving support section that conducts driving support in accordance with a difference between the mobile object target state determined by the determination section and the mobile object state detected by the detection section.

A mobile object target state determination device according to a fourth aspect of the present invention may further include a generation section that, on the basis of the mobile object target state determined by the determination section, generates time series data of the mobile object state up to the mobile object target state, wherein the driving support section conducts driving support in accordance with a difference between the mobile object state time series data generated by the generation section and the mobile object state detected by the detection section.

A mobile object target state determination device according to a fifth aspect of the present invention may further include: a generation section that, on the basis of the mobile object target state determined by the determination section, generates time series data of the mobile object state up to the mobile object target state; and a state prediction section that, on the basis of the mobile object state detected by the detection section, predicts time series data of the mobile object state of the determination target mobile object up to the mobile object target state, wherein the driving support section conducts driving support in accordance with a difference between the mobile object state time series data generated by the generation section and the mobile object state time series data predicted by the state prediction section.

In a mobile object target state determination device according to a sixth aspect of the present invention, the mobile object target state determined by the determination section may be a standard mobile object state when passing the vicinity mobile object to sideward, forward or rearward, corresponding to the mobile object state detected by the detection section and the collision probability predicted by the collision prediction section, the mobile object target state being determined on the basis of a relationship between the mobile object state, the collision probability and the mobile object state when passing another mobile object to sideward, forward or rearward, and the relationship having been pre-specified on the basis of mobile object states, collision probabilities and mobile object states when passing other mobile objects to sideward, forward or rearward that are determined when prospective collision probabilities with the other mobile objects are predicted in standard movements of the mobile object.

A mobile object target state determination device according to a seventh aspect of the present invention may further include: a learning data generation section that generates plural sets of learning data that are the collision probabilities predicted by the collision prediction section in the standard movements of the determination target mobile object, the mobile object states detected by the detection section when these collision probabilities are predicted, and the mobile object states detected by the detection section when passing the other mobile objects to sideward, forward or rearward; and a movement standard learning section that, on the basis of the plural sets of learning data generated by the learning data generation section, learns the relationship between the mobile object state, the collision probability and the mobile object state when passing another mobile object to sideward, forward or rearward in standard movements of the determination target mobile object, wherein the mobile object target state determined by the determination section is the standard mobile object state when passing the vicinity mobile object to sideward, forward or rearward that, on the basis of learning results at the movement standard learning section, corresponds to the mobile object state detected by the detection section and the collision probability predicted by the collision prediction section.

Advantageous Effects of Invention

As described hereabove, according to the mobile object target state determination device and program of the present invention, an effect is provided in that a mobile object state to be a target may be efficiently determined by the determination of a mobile object target state that corresponds to a detected mobile object state and a predicted collision probability on the basis of pre-specified relationships between mobile object states, collision probabilities and mobile object target states.

BRIEF DESCRIPTION OF DRAWINGS

FIG. 3 is a diagram showing an example of learning data.

FIG. 7 is a diagram showing a table storing regression coefficients for respective approach speeds.

BEST MODE FOR CARRYING OUT THE INVENTION

Herebelow, exemplary embodiments of the present invention are described in detail with reference to the attached drawings. In the present embodiments, a case in which the present invention is applied to a driving support device mounted in a vehicle is described as an example.

Figure 1:
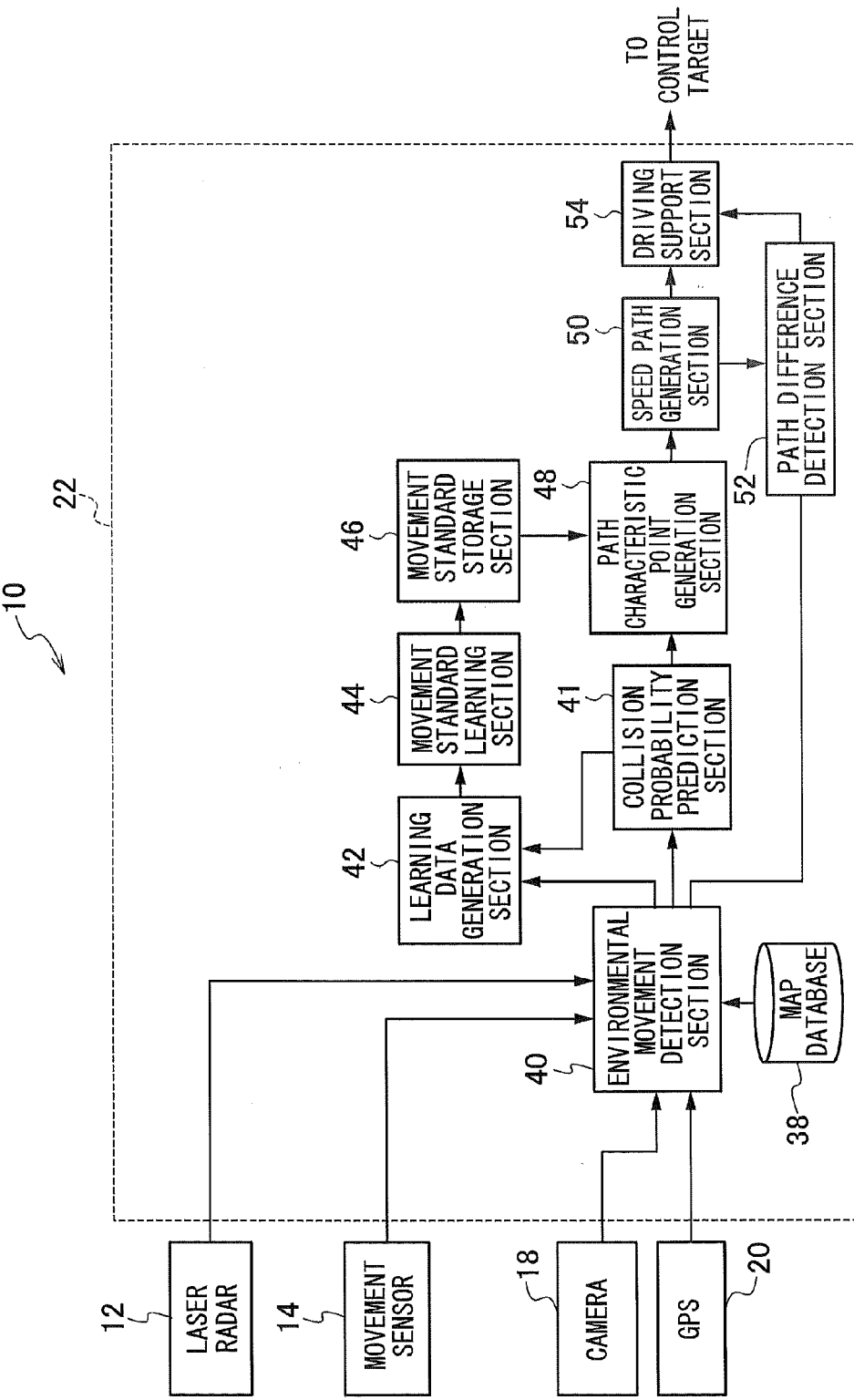
FIG. 1 is a block diagram showing a driving support device in accordance with a first exemplary embodiment of the present invention.

As shown in FIG. 1, a driving support device 10 according to a first exemplary embodiment is equipped with a laser radar 12, a movement sensor 14, a camera 18, a GPS device 20 and a computer 22. The laser radar 12 illuminates a laser to forward of the vehicle while scanning the laser in one dimension (a horizontal direction) and, from reflections of the laser, detects two-dimensional positions of objects illuminated by the laser. The movement sensor 14 detects movement states of the vehicle. The camera 18 captures images forward from the vehicle. The GPS device 20 detects positions of the vehicle. On the basis of detection results from the above components, the computer 22 detects differences from vehicle speeds that are standards and conducts driving support.

The laser radar 12 is disposed at the forward side of the vehicle, and detects distances, measured from the device, to objects that are present forward of the vehicle. By scanning the output laser in the horizontal direction, the laser radar 12 may detect the positions of plural points on the surfaces of plural objects disposed forward of the vehicle from laser reflections. The detection results from the laser radar 12 are a collection of two-dimensional co-ordinates representing the positions of points on the surfaces of the objects disposed forward of the vehicle. The detection processing by the laser radar 12 is executed at a constant cycle and, at respective points in time, the laser radar 12 outputs data representing the two-dimensional positions of the plural points on the surfaces of the objects disposed forward of the vehicle to the computer 22.

The movement sensor 14 is structured with a speed sensor that measures speeds of the vehicle, and a gyro sensor that measures yaw rates and/or an acceleration sensor that measures accelerations of the vehicle.

The camera 18 is structured with a miniature CCD camera or CMOS camera, and is mounted at an upper portion of a windshield or the like of the vehicle so as to capture images forward of the vehicle. Image data of forward road conditions and the like that is captured by the camera 18 is inputted to the computer 22.

The computer 22 is structured with a CPU, a ROM that stores a program for executing a driving support processing routine which is described later, a RAM that stores data and the like, and a bus connecting the CPU, ROM and RAM. The computer 22 will be described as functional blocks divided into specified function implementation units based on hardware and software. As shown in FIG. 1, the computer 22 is equipped with a map database 38, an environmental movement detection section 40, a collision probability prediction section 41, a learning data generation section 42, a movement standard learning section 44 and a movement standard storage section 46. The map database 38 stores electronic maps. On the basis of two-dimensional positions of objects detected by the laser radar 12, speeds, yaw rates and accelerations detected by the movement sensor 14, the forward images captured by the camera 18, the stored electronic maps, and positions of the vehicle detected by the GPS device 20, the environmental movement detection section 40 detects movement states of the vehicle, mobile objects in the vicinity of the vehicle, states of the mobile objects in the vicinity of the vehicle, and conditions of the running environment. From detection results from the environmental movement detection section 40, the collision probability prediction section 41 predicts probabilities of prospective collisions between the vehicle and the mobile objects in the vicinity of the vehicle. The learning data generation section 42 generates learning data from the detection results from the environmental movement detection section 40 and the prediction results from the collision probability prediction section 41. On the basis of the learning data, the movement standard learning section 44 learns data representing movement standards. The movement standard storage section 46 stores learning results from the movement standard learning section 44.

The electronic maps stored in the map database 38 include information relating to road shapes, signage displays, buildings and so forth.

From detection results from the movement sensor 14, the environmental movement detection section 40 acquires a speed, acceleration and/or yaw rate of the vehicle, which are a movement state of the vehicle. On the basis of a vehicle position detected by the GPS device 20, the environmental movement detection section 40 detects information, from an electronic map in the map database 38, relating to the permissibility of entering areas in the vicinity of the vehicle (road lanes, sidewalks, crosswalks and the like), signage displays (traffic lights, stop lines and so forth), and buildings and the like.

The environmental movement detection section 40 specifies that objects are not present in regions at the sensor side of a laser reflection point and that the far side of a laser reflection point is a blind spot. On the basis of measurement data from the laser radar 12, the environmental movement detection section 40 defines blind spot regions formed by stationary objects seen from the vehicle.

From a forward image captured by the camera 18 and measurement data from the laser radar 12, the environmental movement detection section 40 uses an adaptive pattern recognition technology (for example, SVM) to detect the positions and sizes of mobile objects disposed to forward, types of the mobile objects (for example, pedestrians, bicycles, cars and so forth), attitude states (directions, walking modes and the like) and movement states (speeds, yaw rates, accelerations and the like). By finding differences over time in the measurement data from the laser radar 12, the environmental movement detection section 40 identifies moving objects and stationary objects. The environmental movement detection section 40 also detects types of mobile objects and movement states of mobile objects that may potentially be in the defined blind spot regions.

The collision probability prediction section 41 generates a map containing the vicinity of the vehicle and, on the basis of the vehicle speed detected by the environmental movement detection section 40, puts a position distribution and speed distribution of the vehicle on the map. On the basis of the position of each mobile object detected by the environmental movement detection section 40 in the vicinity of the vehicle and the speed of the mobile object in the vicinity of the vehicle, the collision probability prediction section 41 puts a position distribution and a speed distribution of the vicinity mobile object on the map.

For the mobile objects on this map, including the vehicle, the collision probability prediction section 41 performs linear forecasting from the position distributions in accordance with the speed distributions, and predicts the future at subsequent points in time, step by step in pre-defined steps.

The collision probability prediction section 41 repeatedly executes this prediction of future distributions in correspondence with pre-specified prediction time intervals. In accordance with overlaps between the predicted position distributions of the vehicle and position distributions of each vicinity mobile object, the collision probability prediction section 41 calculates a probability of collision between the vehicle and the vicinity mobile object.

Figure 2:
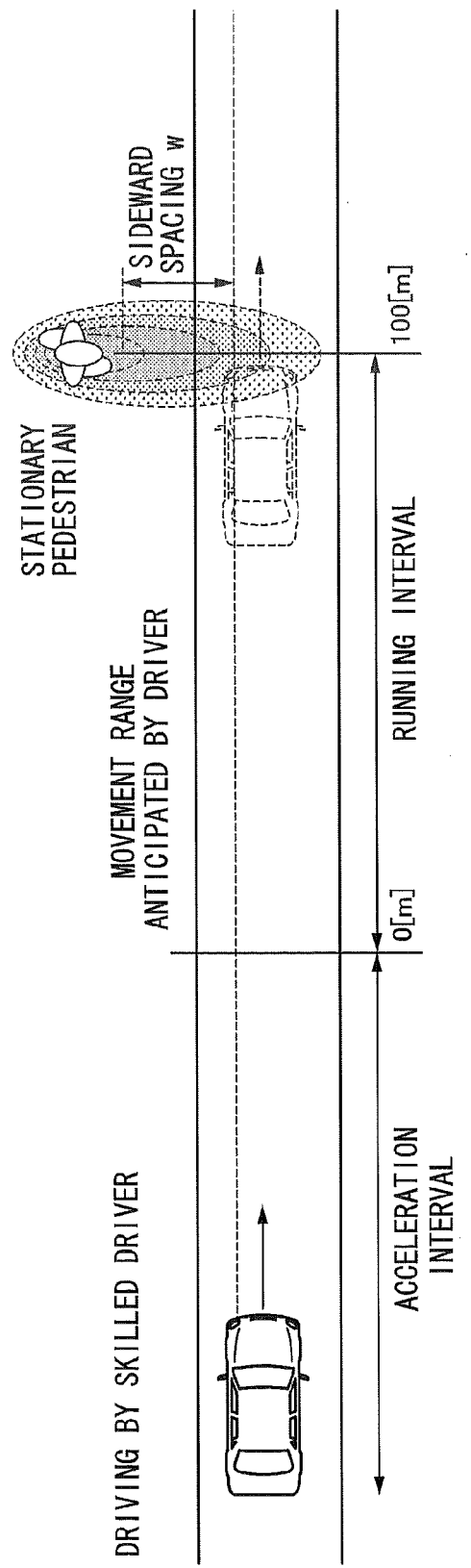
FIG. 2 is a conceptual diagram showing a state in which an approach speed and a sideward spacing are acquired to serve as learning data.

When a standard driver (for example, a skilled driver) is driving, as illustrated in FIG. 2, the learning data generation section 42 acquires, from the detection results from the environmental movement detection section 40, a speed of the vehicle before passing a vicinity mobile object to sideward (for example, 100 m before a sideward passing point), to serve as an approach speed. From the detection results from the environmental movement detection section 40, the learning data generation section 42 acquires a speed of the vehicle when passing the vicinity mobile object to sideward, to serve as a sideward passing speed. The learning data generation section 42 also acquires, from the detection results from the environmental movement detection section 40, a position of the vehicle and a position of the vicinity mobile object and calculates a lateral direction distance between the position of the vehicle and the position of the vicinity mobile object, to serve as a sideward spacing. The learning data generation section 42 further acquires a collision probability predicted by the collision probability prediction section 41 before passing the vicinity mobile object to sideward. As illustrated in FIG. 3, the learning data generation section 42 generates plural sets of learning data formed of the approach speed, sideward spacing, collision probability and sideward passing speed obtained that are as described above.

Figure 4:
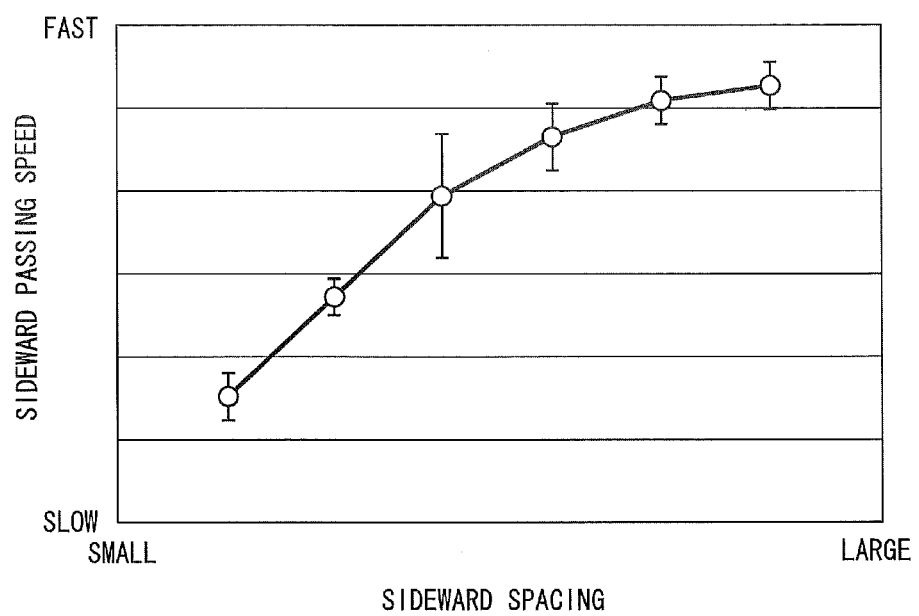
FIG. 4 is a graph showing a relationship between sideward spacing and sideward passing speed.
Figure 5:
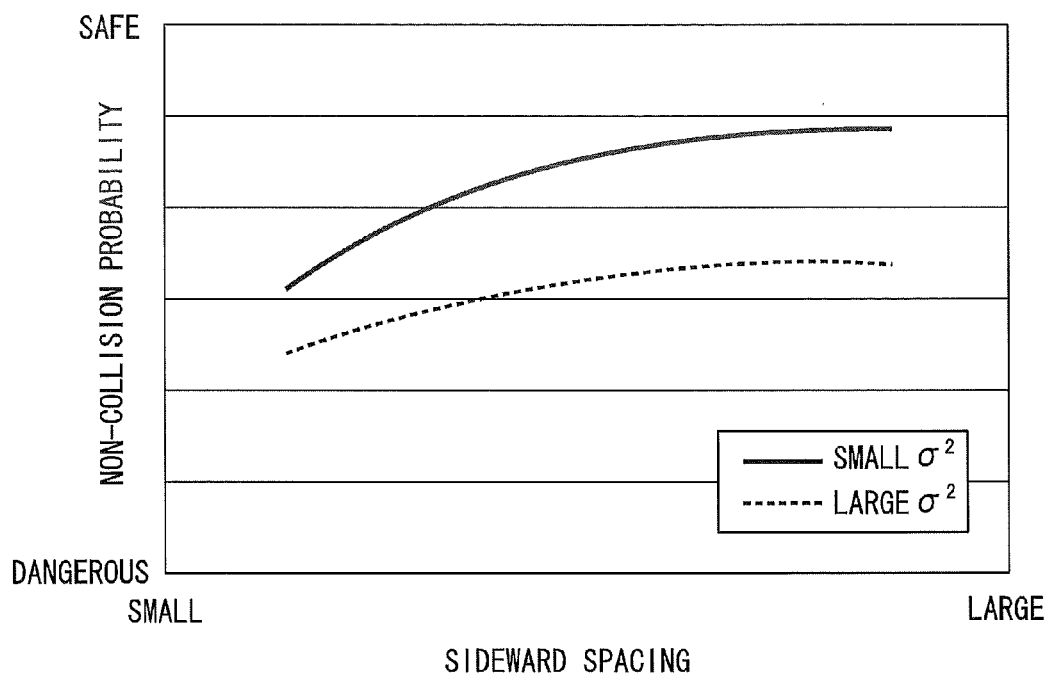
FIG. 5 is a graph showing a relationship between sideward spacing and non-collision probability.

The sideward spacing and sideward passing speed have a relationship such as that shown in FIG. 4. For example, in cases in which the approach speed is 60 km/h, the greater the sideward spacing, the higher the sideward passing speed. The sideward spacing and a non-collision probability in cases in which a pedestrian is moving randomly have a relationship such as that shown in FIG. 5. For example, in cases in which the approach speed is 60 km/h, the greater the sideward spacing, the higher the non-collision probability. Meanwhile, the larger the position distribution of the pedestrian, the lower the non-collision probability.

Figure 6:
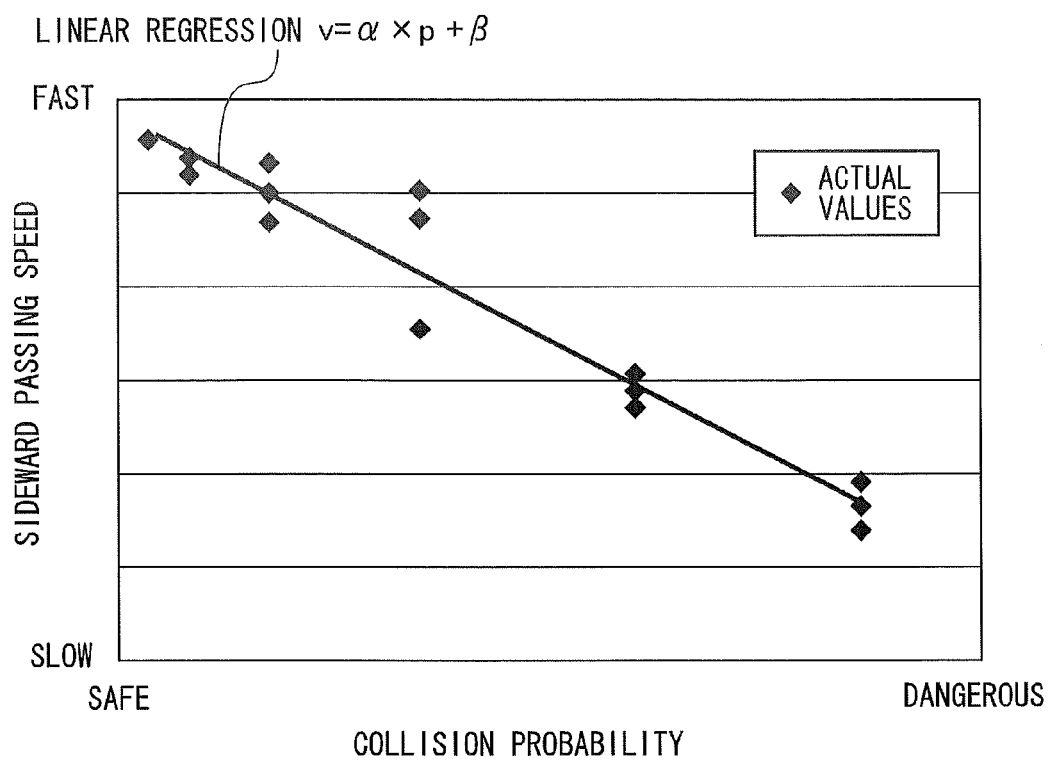
FIG. 6 is a graph showing a relationship between collision probability and sideward passing speed.

On the basis of the plural sets of generated learning data, the movement standard learning section 44 learns relationships between approach speed, collision probability and sideward passing speed, to serve as movement standards. As illustrated in FIG. 6, for each of respective approach speeds, a first-order linear regression $v = \alpha \times p + \beta$ representing the relationship between the collision probability p and the side passing speed v is learned. As illustrated in FIG. 7, the learning results are obtained in the form of a table storing, for each approach speed, a first-order coefficient $\alpha$ and an intercept $\beta$.

The movement standard storage section 46 memorizes the table obtained as learning results, in which the first-order coefficient $\alpha$ and intercept $\beta$ of the first-order linear regression for each approach speed are stored.

The computer 22 is equipped with a path characteristic point generation section 48, a speed path generation section 50, a path difference detection section 52 and a driving support section 54. The path characteristic point generation section 48 uses the table stored at the movement standard storage section 46 to determine the sideward passing speed, which is a movement standard, on the basis of the predicted collision probability and the approach speed of the vehicle, and generates a characteristic point of a speed path. On the basis of the characteristic point of the speed path, the speed path generation section 50 generates a speed path representing time series data of standard movement states from a current state until the vicinity mobile object is passed to sideward. The path difference detection section 52 detects respective differences between the generated speed path and driving states of the vehicle detected by the environmental movement detection section 40. On the basis of the differences between the generated speed path and the detected speed path, the driving support section 54 conducts driving intervention control and conducts driving support. Herein, the path characteristic point generation section 48 is an example of a determination section and the speed path generation section 50 is an example of a generation section.

Figure 8:
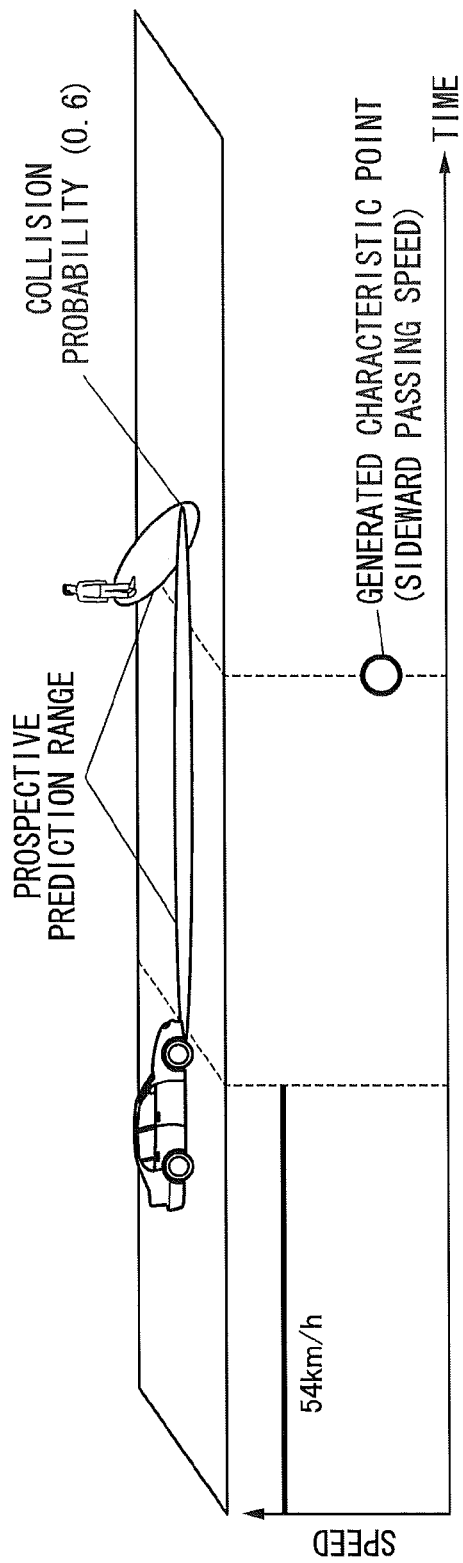
FIG. 8 is a diagram showing a state in which a characteristic point representing a standard sideward passing speed is generated.

From the table memorized at the movement standard storage section 46, the path characteristic point generation section 48 acquires the regression coefficients (the first-order coefficient $\alpha$ and intercept $\beta$ of the first-order linear regression that corresponds to the approach speed that is closest to the detected approach speed of the vehicle. In accordance with the first-order linear regression employing the acquired regression characteristics, the path characteristic point generation section 48 calculates a sideward passing speed corresponding to the predicted collision probability and, as shown in FIG. 8, generates a characteristic point representing the calculated sideward passing speed.

Figure 9A:
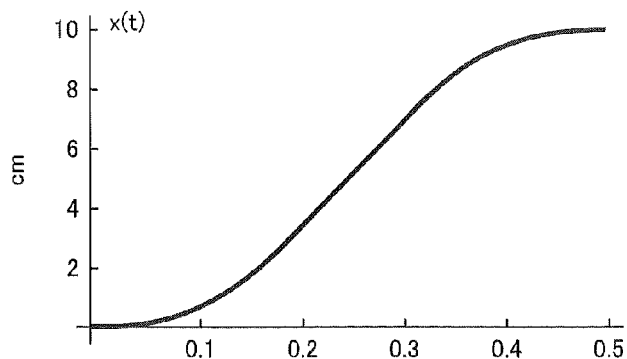
FIG. 9A is a graph showing changes of position of a vehicle.
Figure 9B:
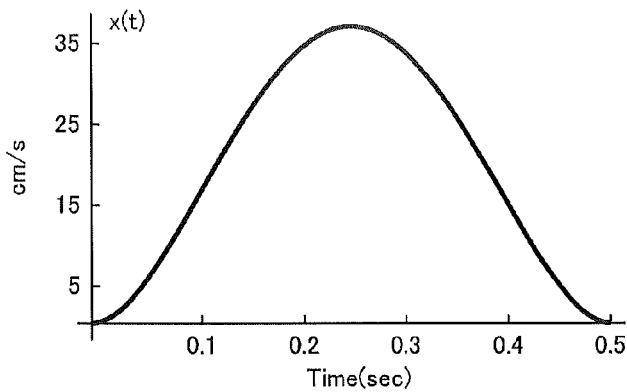
FIG. 9B is a graph showing changes of speed of the vehicle.
Figure 9C:
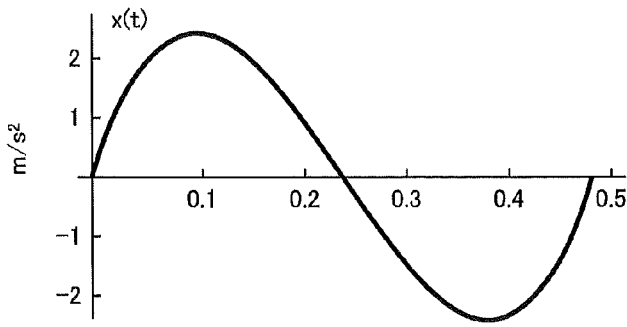
FIG. 9C is a graph showing changes of acceleration of the vehicle.
Figure 9D:
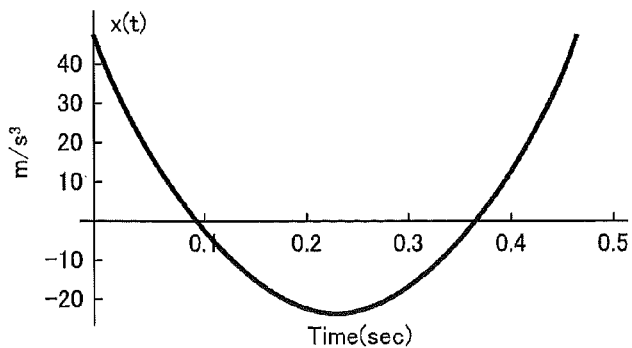
FIG. 9D is a graph showing changes of jerk.

The speed path generation section 50 generates a smooth path connecting the driving state detected before passing sideward of the vicinity mobile object (i.e., the approach speed) with the generated characteristic point (i.e., the sideward passing speed). For example, in accordance with the following expression (1), the speed path generation section 50 generates a path (see FIG. 10) in which a sum of acceleration increments is at a minimum (see FIG. 9D), that is, a minimum jerk path (n=4).

$$\hat{x}(t) = \underset{x(t)}{\mathrm{argmin}} H(x(t)) \tag{1}$$

$$\text{subject to: } x(t_p) = x_p, x(t_f) = x_f$$

wherein, $$H(x(t)) = \frac{1}{2} \int_{t_i}^{t_f} \left( \frac{d^n x}{dt^n} \right)^2 dt$$

In this expression, $t_i$ is a start time, $t_f$ is a finish time, $t_p$ is a time of passing an intermediate point, x is position, $x_p$ is the intermediate point's position, and $x_f$ is a finishing point position.

Figure 10:
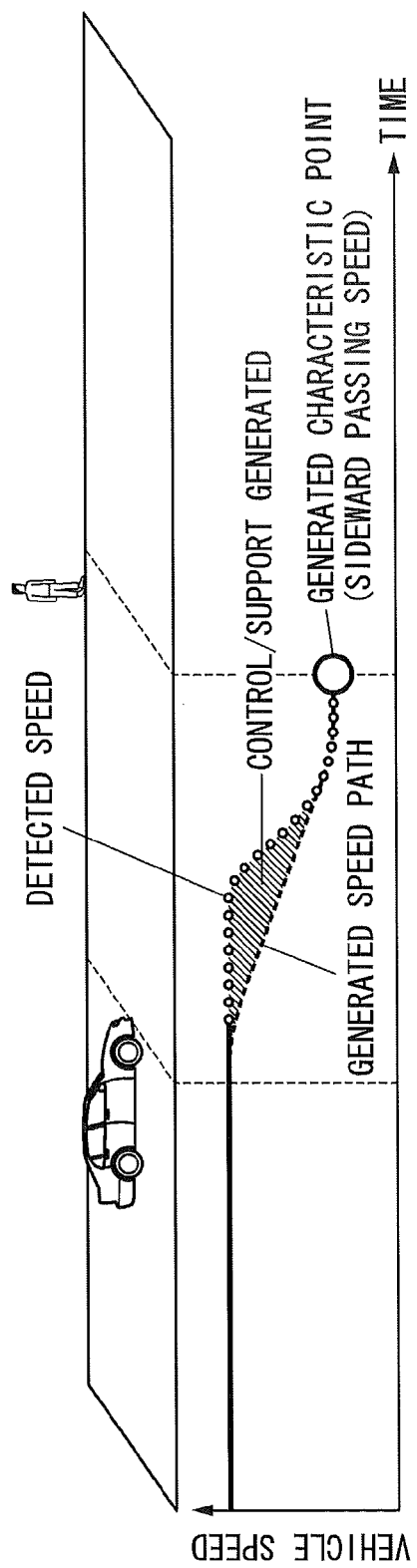
FIG. 10 is a diagram showing differences between a generated speed path and detected speeds.

Each time the speed of the vehicle is detected, the path difference detection section 52 detects a respective difference between the generated speed path representing changes of speed and the detected speed of the vehicle, as shown in FIG. 10.

On the basis of the detected differences, the driving support section 54 conducts driving intervention control to control acceleration/deceleration and/or steering of the vehicle so as to reduce the difference.

Figure 11:
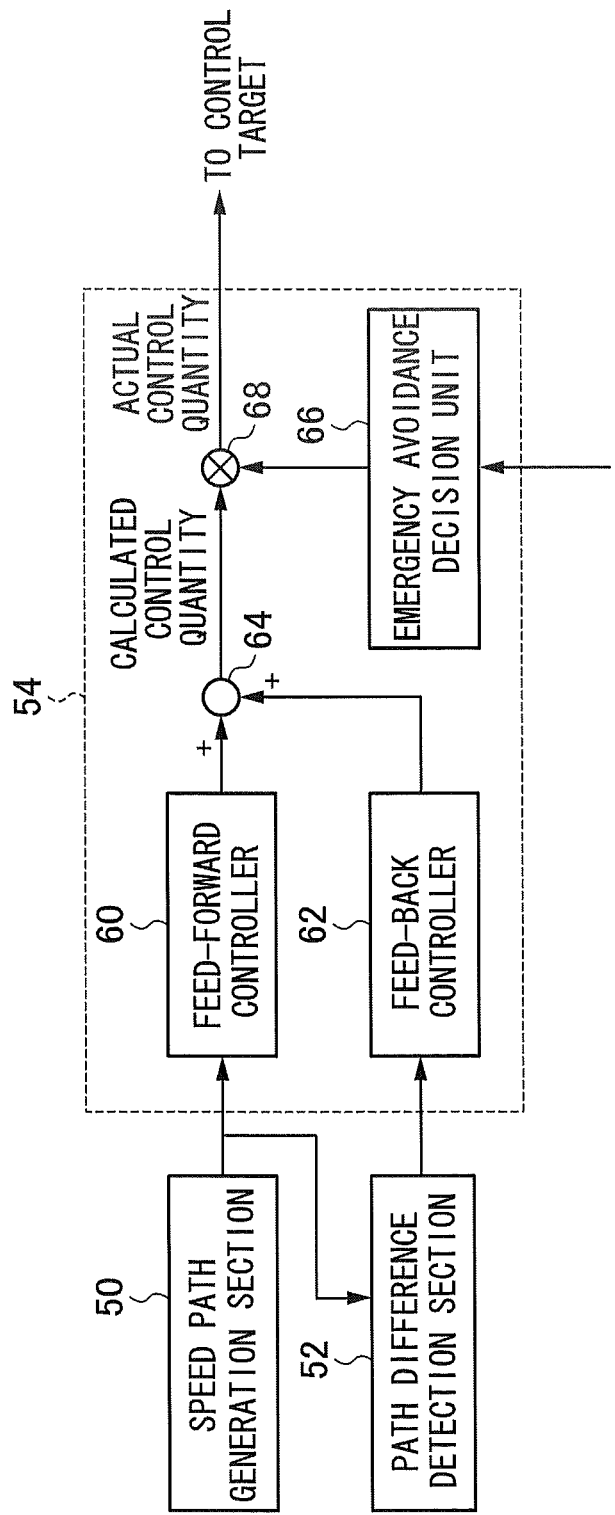
FIG. 11 is a block diagram showing the structure of a driving support section of the driving support device in accordance with the first exemplary embodiment of the present invention.

As shown in FIG. 11, the driving support section 54 is equipped with a feed-forward controller 60, a feed-back controller 62, an adder 64, an emergency avoidance decision unit 66 and a multiplier 68. The feed-forward controller 60 inputs outputs from the speed path generation section 50 (the speed path) and outputs control quantities (for example, throttle positions). The feed-back controller 62 inputs outputs from the path difference detection section 52 (differences from the speed path) and outputs control quantities (throttle positions). The adder 64 adds the control quantities (throttle positions) outputted from the feed-forward controller 60 and the feed-back controller 62. The multiplier 68 multiplies control quantities (throttle positions) outputted from the adder 64 with outputs of the emergency avoidance decision unit 66 (throttle position command values when there is an emergency), and calculates actual control values (throttle positions).

The emergency avoidance decision unit 66 outputs emergency command values to the multiplier 68 if the driver has performed an emergency operation for avoiding danger at their own initiative, or if an emergency avoidance device (not shown in the drawings) for reducing the damage of collisions has operated, or the like. Hence, control in accordance with emergency operations by the driver themself, operations of the emergency avoidance device or the like is given priority.

The multiplier 68 outputs a calculated actual control quantity (a throttle position command value) to a control target of the driving intervention control (for example, the engine).

Now, operation of the driving support device 10 according to the present exemplary embodiment is described.

A laser from the laser radar 12 scans in a horizontal direction forward of the vehicle, and respective two-dimensional positions of objects are measured as laser illumination positions arrayed along the scanning direction. Thus, the two-dimensional positions of objects in front of the vehicle are detected. The two-dimensional positions detected by the laser radar 12 are obtained each time the laser scans.

The movement sensor 14 repeatedly detects the vehicle speed and yaw rate/acceleration. The GPS device 20 repeatedly measures the position of the vehicle, and the camera 18 captures images forward of the vehicle.

If the start of learning processing when a standard driver is driving is instructed, the computer 22 acquires the forward images captured by the camera 18, the vehicle positions detected by the GPS device 20, the measurement data from the laser radar 12, and the speeds and yaw rates/accelerations detected by the movement sensor 14. On the basis of the acquired forward images and vehicle positions and the electronic maps in the map database 38, the computer 22 detects conditions of the running environment containing the vicinity of the vehicle. On the basis of the acquired forward images and measurement results from the laser radar 12, the computer 22 detects mobile objects in the vicinity and movement states of the mobile objects, and identifies types of the mobile objects and stationary objects.

Hence, the computer 22 predicts a prospective collision probability between a detected vicinity mobile object and the vehicle.

The computer 22 collects the predicted prospective collision probability, the speed of the vehicle detected at the time that the collision probability is predicted (the approach speed) and the speed of the vehicle detected when passing the vicinity mobile object to sideward (the sideward passing speed) to serve as learning data.

Then, on the basis of plural sets of the collected learning data, the computer 22 learns the first-order coefficient α and intercept β of the first-order linear regression representing the relationship between collision probability and sideward passing speed, for each of the respective approach speeds. As the learning results, the computer 22 obtains the table storing the first-order coefficient α and intercept β for each approach speed. The computer 22 stores the obtained table at the movement standard storage section 46.

Figure 12:
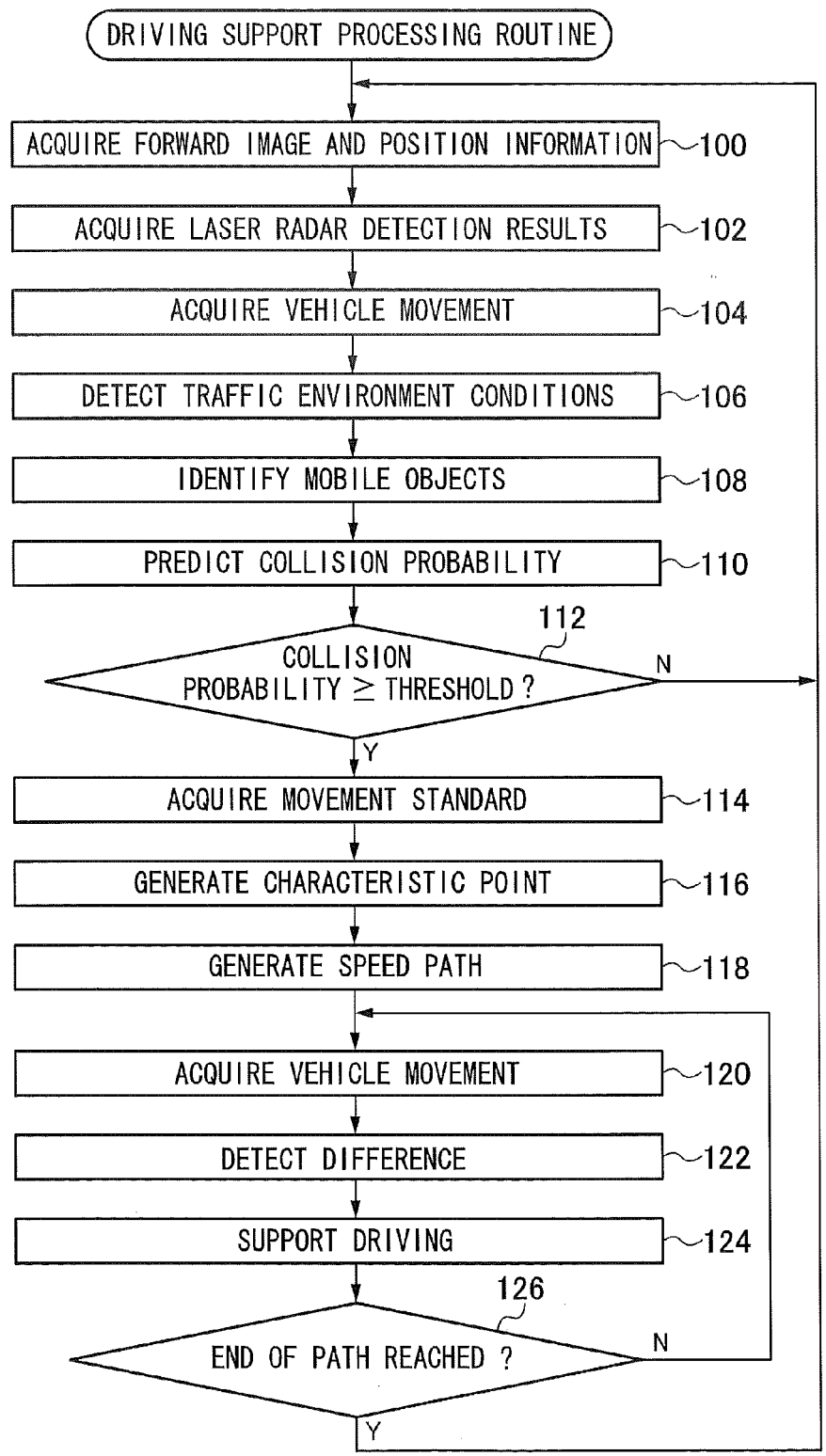
FIG. 12 is a flowchart showing the details of a driving support processing routine of the driving support device in accordance with the first exemplary embodiment of the present invention.

Hence, the driving support processing routine shown in FIG. 12 is executed by the computer 22.

First, in step 100, the computer 22 acquires the forward image captured by the camera 18 and the vehicle position detected by the GPS device 20. In step 102, the computer 22 acquires from the laser radar 12 data representing the two-dimensional positions (measured distances to the two-dimensional positions arrayed in the scanning direction) of objects disposed in front. In step 104, the computer 22 acquires the speed and yaw rate/acceleration detected by the movement sensor 14 to serve as the movement state of the vehicle.

In step 106, on the basis of the acquired forward image and vehicle position and an electronic map in the map database 38, the computer 22 detects conditions of the running environment including the areas and road attributes of various driving lanes in the vehicle's vicinity. In step 108, on the basis of the acquired forward image and the measurement results from the laser radar 12, the computer 22 detects mobile objects in the vicinity and movement states of the mobile objects, and also identifies stationary objects and types of the mobile objects.

In step 110, the computer 22 generates a map containing the vehicle's position and the vehicle's vicinity, puts a position distribution and speed distribution of each vicinity mobile object detected in step 108 on the map and, on the basis of the driving state detected in step 104, the computer 22 puts a position distribution and speed distribution of the vehicle on the map. Then, on the basis of the position distribution and speed distribution of the vicinity mobile object and the position distribution and speed distribution of the vehicle, the computer 22 predicts a prospective collision probability.

In step 112, the computer 22 makes a determination as to whether the collision probability predicted in step 110 is at least a threshold value. If the collision probability is less than the threshold, the computer 22 determines that driving support is unnecessary and returns to step 100. On the other hand, if the collision probability is at or above the threshold, in step 114, the computer 22 acquires the first-order coefficient α and intercept β of the first-order linear regression that serve as parameters representing the movement standard corresponding to the speed (approach speed) of the vehicle detected in step 104. In step 116, on the basis of the parameters acquired in step 114 and the collision probability predicted in step 110, the computer 22 calculates a sideward passing speed, which is the standard for when passing the vicinity mobile object to sideward, and generates a characteristic point representing the calculated sideward passing speed.

In step 118, the computer 22 generates a speed path that represents time series data of speeds smoothly joining a point representing the approach speed detected in step 104 with the characteristic point generated in step 116.

In step 120, the computer 22 acquires a speed detected by the movement sensor 14 to serve as a movement state of the vehicle. In step 122, the computer 22 detects a difference between the acquired speed and the speed path generated in step 118.

In step 124, the computer 22 conducts driving intervention control and conducts driving support so as to reduce the difference detected in step 122. In step 126, the computer 22 makes a determination as to whether the end of the speed path has been reached. For example, while the vicinity mobile object for which the collision probability is at or above the threshold has not been passed to sideward, it is determined that the end of the speed path has not been reached, and the computer 22 returns to step 120. On the other hand, when the vicinity mobile object for which the collision probability is at or above the threshold has been passed to sideward, the computer 22 determines that the end of the speed path has been reached, and returns to step 100.

As described hereabove, the driving support device according to the first exemplary embodiment determines a standard sideward passing speed corresponding to a detected approach speed and a predicted prospective collision probability, on the basis of a first-order linear regression between prospective collision probabilities and sideward passing speeds when passing other mobile objects to sideward, which is learned for the respective approach speed. Thus, the driving support device may determine a standard sideward passing speed efficiently.

Moreover, the driving support device detects differences between actual speeds and a speed path smoothly connecting generated characteristic points, and performs feedback control so as to reduce the differences. Thus, driving in accordance with a movement standard is possible.

Furthermore, the driving support device may simplify processing for learning movement standards. For example, the driving support device may summarize information representing various conditions such as the distance from a pedestrian, the facing of the pedestrian, the pedestrian's speed, the distance between the pedestrian and a road crossing and suchlike in the collision probability, and learn the relationship between approach speed and sideward passing speed. Thus, the learning processing may be simplified.

Now, a driving support device in accordance with a second exemplary embodiment is described. The driving support device according to the second exemplary embodiment has the same structure as in the first exemplary embodiment, so the same reference numerals are assigned and descriptions of the structure are not given.

The second exemplary embodiment differs from the first exemplary embodiment in that a neural network that inputs approach speeds and collision probabilities and outputs sideward passing speeds performs the learning.

Figure 13:
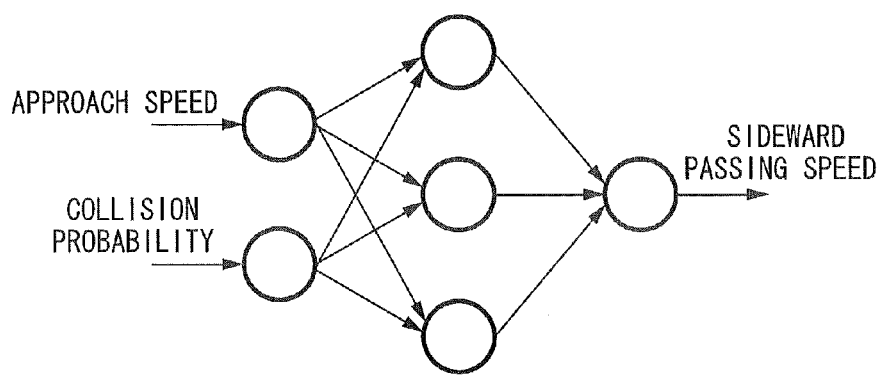
FIG. 13 is a diagram illustrating a neural network.

In the second exemplary embodiment, the movement standard learning section 44 learns a neural network that represents relationships between approach speeds, collision probabilities and sideward passing speeds to serve as movement standards based on plural sets of generated learning data. As illustrated in FIG. 13, the movement standard learning section 44 learns connection weightings $w_{11}$, $w_{12}$,. . ., $w_{31}$ of the neural network that inputs approach speeds and collision probabilities and outputs sideward passing speeds on the basis of the plural sets of learning data.

The movement standard storage section 46 memorizes the connection weightings $w_{11}$, $w_{12}$, $w_{31}$ of the neural network that are obtained as learning results.

The path characteristic point generation section 48 inputs an approach speed of the vehicle and a predicted collision probability to the neural network employing the connection weightings memorized in the movement standard storage section 46, calculates a sideward passing speed, and generates a characteristic point representing the calculated sideward passing speed.

Other structures and operations of the driving support device according to the second exemplary embodiment are the same as in the first exemplary embodiment, so are not described here.

As described hereabove, the driving support device according to the second exemplary embodiment determines a standard sideward passing speed corresponding to a detected approach speed and a predicted prospective collision probability, on the basis of a neural network representing learned relationships between approach speeds, prospective collision probabilities and sideward passing speeds when passing other mobile objects to sideward. Thus, the driving support device may determine a standard sideward passing speed efficiently.

Next, a driving support device in accordance with a third exemplary embodiment is described. Portions that have the same structure as in the first exemplary embodiment are assigned the same reference numerals and are not described.

The third exemplary embodiment differs from the first exemplary embodiment in that a difference between the characteristic point representing a standard sideward passing speed and an actual speed is detected and reported to a driver.

Figure 14:
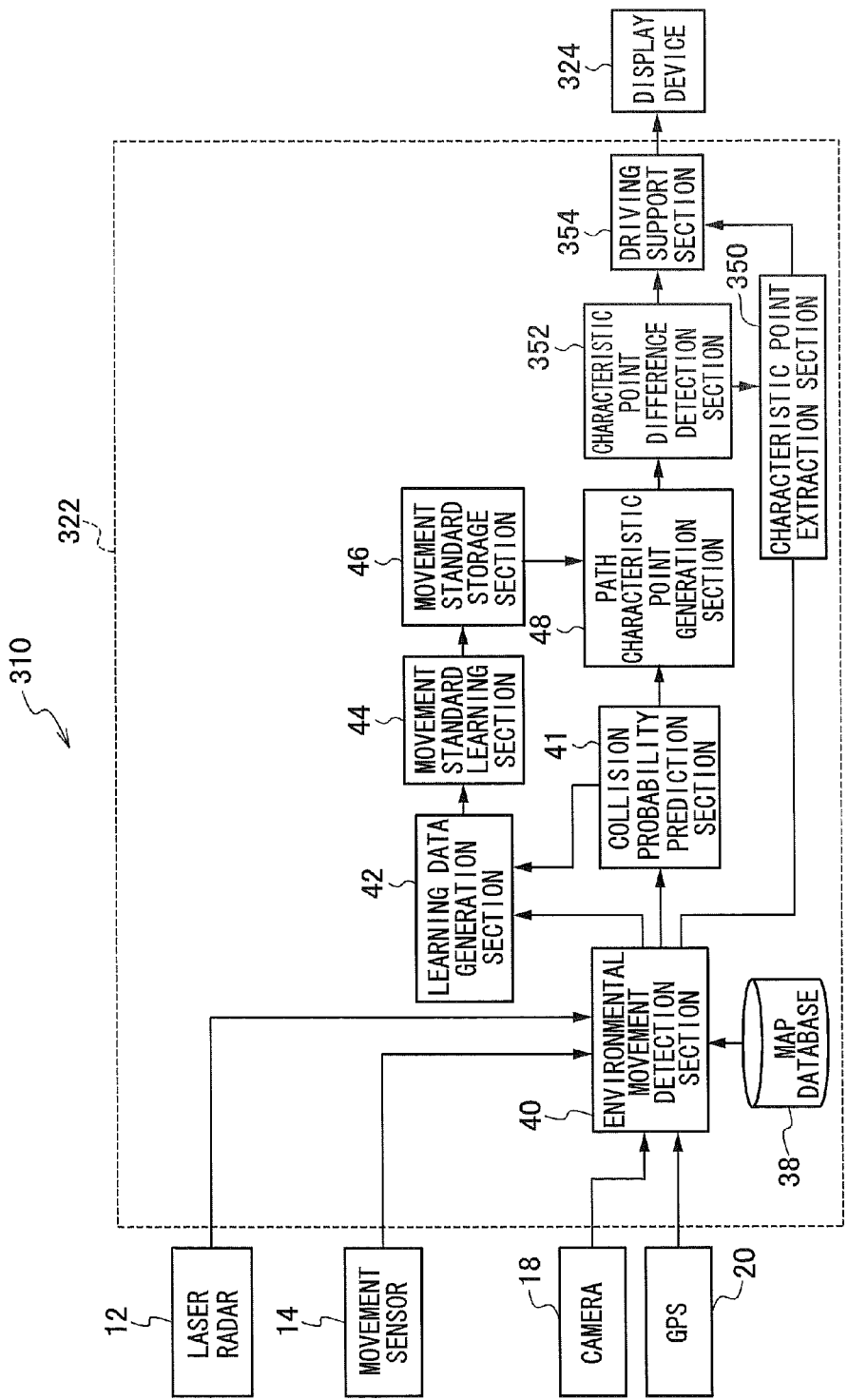
FIG. 14 is a block diagram showing a driving support device in accordance with a third exemplary embodiment of the present invention.

As shown in FIG. 14, a computer 322 of a driving support device 310 according to the third exemplary embodiment is equipped with the map database 38, the environmental movement detection section 40, the collision probability prediction section 41, the learning data generation section 42, the movement standard learning section 44, the movement standard storage section 46, the path characteristic point generation section 48, a characteristic point extraction section 350, a characteristic point difference detection section 352 and a driving support section 354. The characteristic point extraction section 350 extracts, from a time series of data of movement states of the vehicle detected by the environmental movement detection section 40, a characteristic point that corresponds with a characteristic point generated by the path characteristic point generation section 48. The characteristic point difference detection section 352 detects a difference between the characteristic point generated by the path characteristic point generation section 48 and the characteristic point extracted by the characteristic point extraction section 350. The driving support section 354 displays the detected difference from the characteristic point at a display device 324, reporting the difference to the driver.

Figure 15:
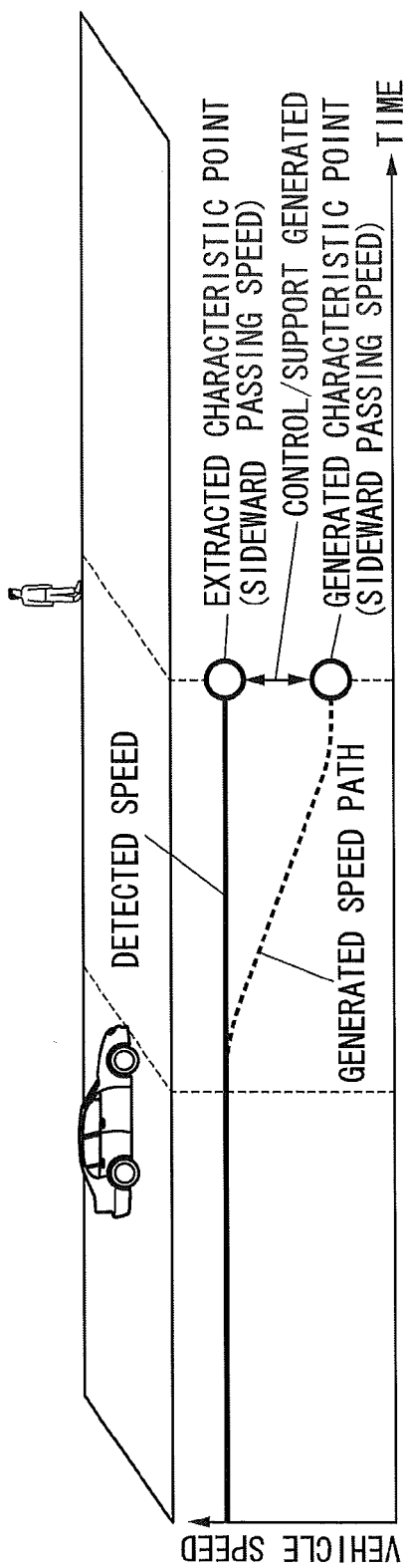
FIG. 15 is a diagram showing a difference between a generated characteristic point and a characteristic point extracted from time series data of a detected speed.

The characteristic point extraction section 350 records speeds of the vehicle detected by the environmental movement detection section 40, aggregates the speed until a vicinity of the furthest of generated characteristic points is reached and, as illustrated in FIG. 15, obtains time series data of the speed of the vehicle. After the vehicle has passed a position corresponding to the furthest generated characteristic point, the characteristic point extraction section 350 extracts a characteristic point from the vehicle speed time series data that corresponds with the generated characteristic point.

The characteristic point difference detection section 352 detects a difference between the characteristic point generated by the path characteristic point generation section 48 and the characteristic point extracted by the characteristic point extraction section 350, as illustrated in FIG. 15.

Figure 16:
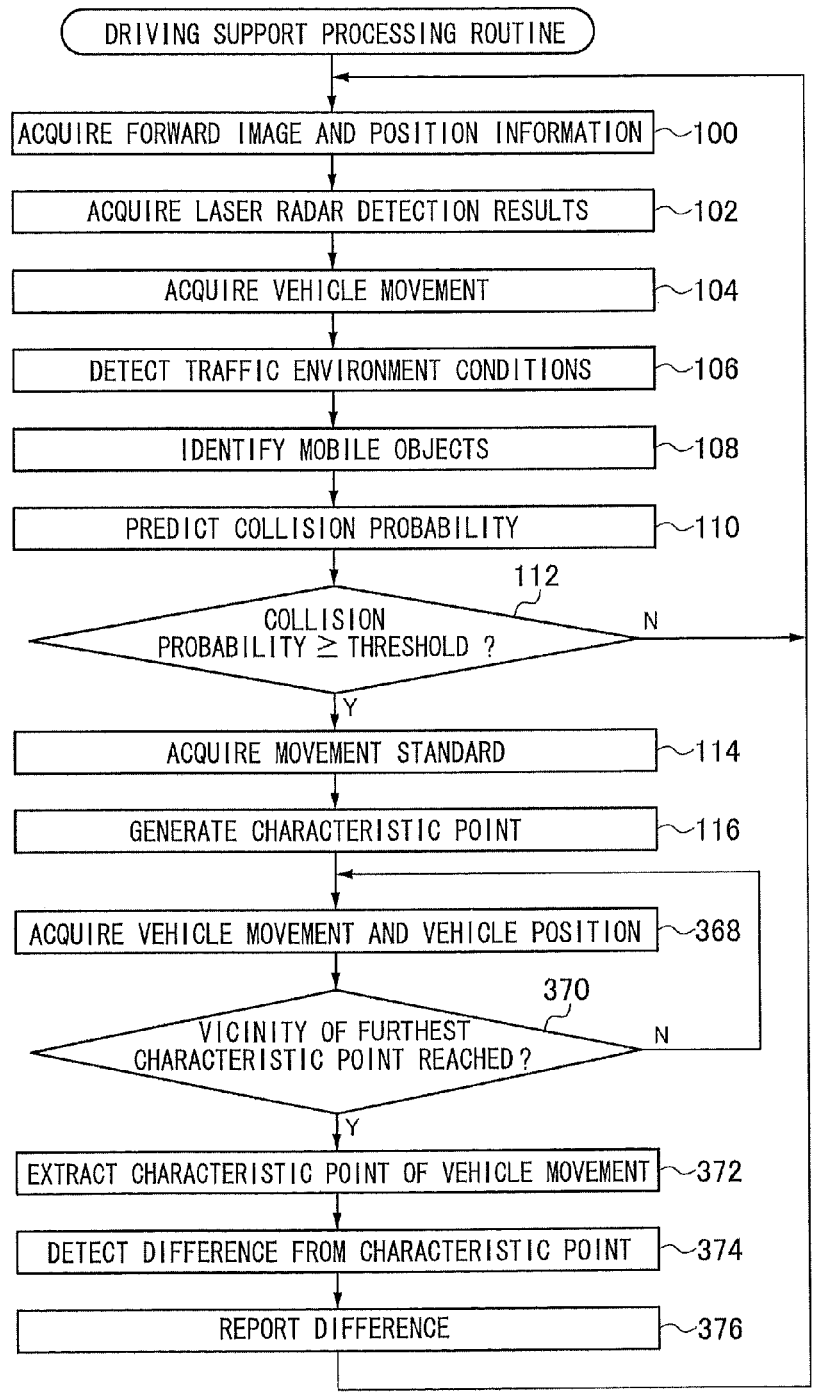
FIG. 16 is a flowchart showing the details of a driving support processing routine of the driving support device in accordance with the third exemplary embodiment of the present invention.

Now, a driving support processing routine according to the third exemplary embodiment is described using FIG. 16. Processing that is the same as in the first exemplary embodiment is assigned the same reference numerals and is not described in detail.

In step 100, the computer 322 acquires the forward image captured by the camera 18 and the vehicle position detected by the GPS device 20. In step 102, the computer 322 acquires from the laser radar 12 data representing the two-dimensional positions (measured distances to two-dimensional positions arrayed in the scanning direction) of objects disposed in front of the vehicle. In step 104, the computer 322 acquires the speed and yaw rate/acceleration detected by the movement sensor 14 to serve as the movement state of the vehicle.

In step 106, the computer 322 detects conditions of the running environment including the areas and road attributes of various driving lanes in the vehicle's vicinity. In step 108, the computer 322 detects mobile objects in the vicinity and driving states of the mobile objects, and also identifies stationary objects and types of the mobile objects.

In step 110, on the basis of position distributions and speed distributions of the vicinity mobile objects and the position distribution and speed distribution of the vehicle, the computer 322 predicts prospective collision probabilities. In step 112, the computer 322 makes a determination as to whether a collision probability predicted in step 110 is at least a threshold value. If the collision probabilities are less than the threshold, the computer 322 returns to step 100. On the other hand, if a collision probability is at or above the threshold, in step 114, the computer 322 acquires the first-order coefficient $\alpha$ and intercept $\beta$ of the first-order linear regression corresponding to the speed (approach speed) of the vehicle detected in step 104.

In step 116, the computer 322 calculates a sideward passing speed, which is the standard for when passing the vicinity mobile object to sideward, and generates a characteristic point representing the calculated sideward passing speed.

Then, in step 368, the computer 322 acquires the speed detected by the movement sensor 14 to serve as a movement state of the vehicle, and acquires the vehicle position detected by the GPS device 20.

In step 370, on the basis of the vehicle position acquired in step 368, the computer 322 makes a determination as to whether or not the vicinity of the furthest characteristic point generated in step 116 has been reached. While the vehicle position has not reached to sideward of the vicinity mobile object for which the collision probability is at or above the threshold, the computer 322 returns to step 368. On the other hand, when the vehicle position has reached to sideward of the vicinity mobile object for which the collision probability is at or above the threshold, the computer 322 determines that the vicinity of the furthest characteristic point has been reached and advances to step 372.

In step 372, the computer 322 extracts, from the vehicle speed time series data acquired in step 368, a characteristic point corresponding to the characteristic point generated in step 116. In step 374, the computer 322 detects a difference between the extracted characteristic point and the characteristic point generated in step 116.

In step 376, the computer 322 retrospectively displays the difference detected in step 374 at the display device 324, reporting the difference to the driver, and the computer 322 returns to step 100. For example, the computer 322 displays a message such as "Recommended speed XX km/h" or the like.

In step 368, the computer 322 may, while repeatedly acquiring the speed of the vehicle, repeat the generation of characteristic points if, for an unexpected reason, the vehicle stops completely, the possibility of a collision suddenly changes, the driver cancels support, or the like.

As described hereabove, the driving support device according to the third exemplary embodiment may provide a learning opportunity such that a driver may understand speed control in accordance with the speed path of the standard driver. Moreover, when the generated characteristic points and the characteristic points extracted from an actual speed path are different, the driving support device may give instruction on the characteristic points of a desirable speed path according to the movement standards.

Furthermore, the driving support device may improve intuitive description of the generated characteristic points. For example, it is sufficient for the driving support device to summarize information representing various conditions such as the distance from a pedestrian, the facing of the pedestrian, the pedestrian's speed, the distance between the pedestrian and a road crossing and suchlike in the collision probability, and describe a characteristic point that is generated on the basis of the approach speed and sideward passing speed. In consequence, the driver may more easily understand.

Figure 17:
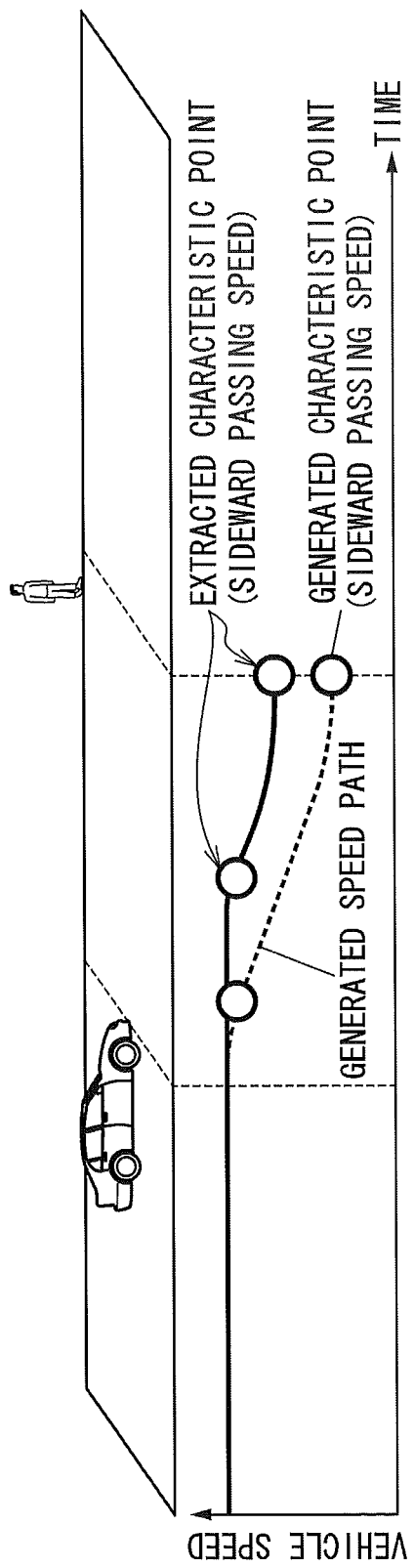
FIG. 17 is a diagram showing a state in which plural characteristic points are extracted from time series data of a detected speed.

A case in which the characteristic point extracted from the vehicle speed time series data is only a point representing the sideward passing speed is described here as an example, but this is not limiting. For example, as shown in FIG. 17, the driving support device may also extract a deceleration position at which a deceleration operation is started to serve as a characteristic point. In this case, it is sufficient for the driving support device to apply a low-frequency filter to changes in the vehicle speed time series, then differentiate, and extract the position of a maximum peak to serve as the deceleration position.

Next, a driving support device in accordance with a fourth exemplary embodiment is described. Portions that have the same structure as in the first exemplary embodiment are assigned the same reference numerals and are not described.

The fourth exemplary embodiment differs from the first exemplary embodiment in that a time series of data of future driving states is predicted, differences between a path (the time series data) up to a characteristic point representing the standard sideward passing speed and the predicted time series data are detected, and the differences are reported to a driver.

Figure 18:
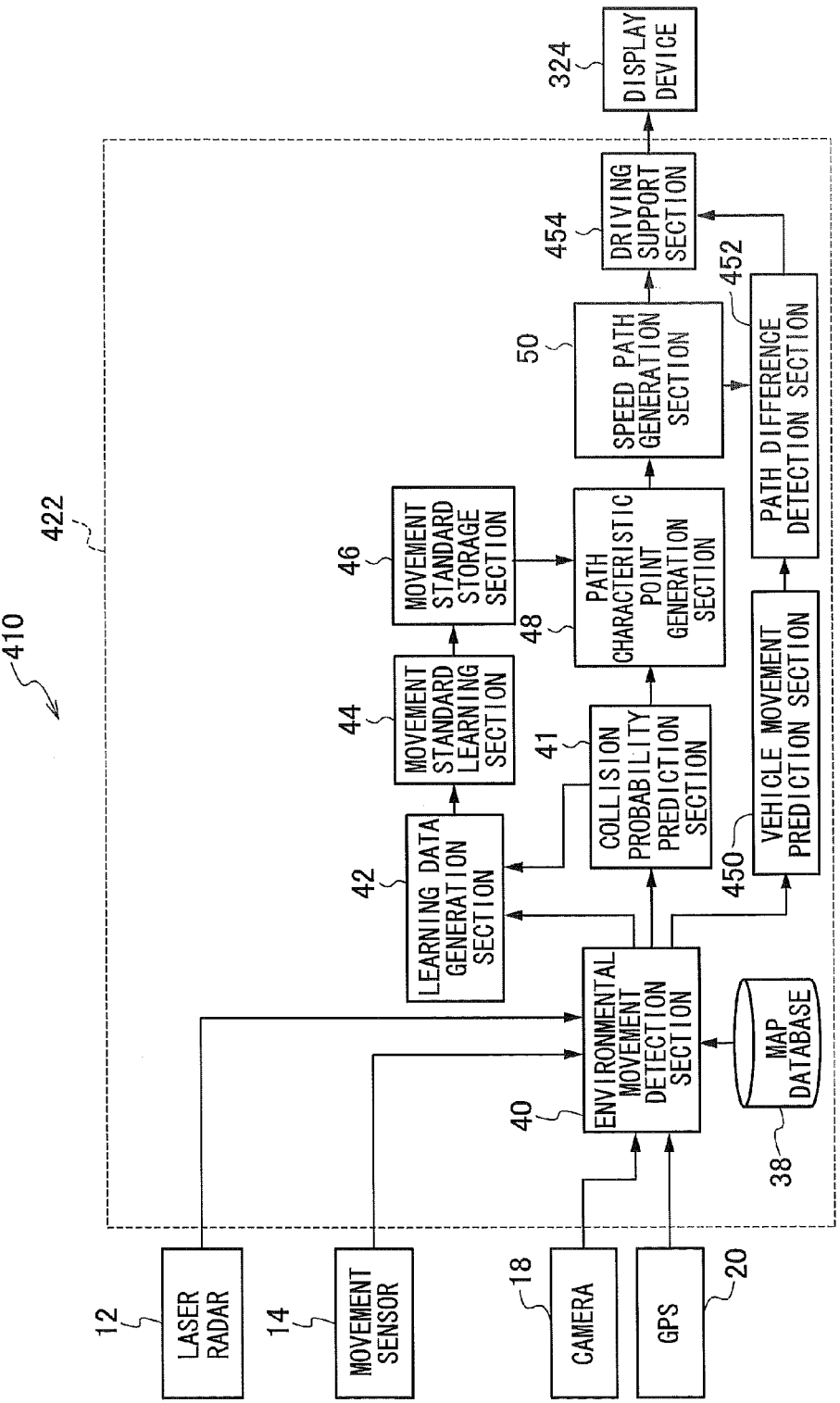
FIG. 18 is a block diagram showing a driving support device in accordance with a fourth exemplary embodiment of the present invention.

As shown in FIG. 18, a computer 422 of a driving support device 410 according to the fourth exemplary embodiment is equipped with the map database 38, the environmental movement detection section 40, the collision probability prediction section 41, the learning data generation section 42, the movement standard learning section 44, the movement standard storage section 46, the path characteristic point generation section 48, the speed path generation section 50, a vehicle movement prediction section 450, a path difference detection section 452 and a driving support section 454. On the basis of driving states of the vehicle detected by the environmental movement detection section 40, the vehicle movement prediction section 450 predicts a time series of data of movement states of the vehicle. The path difference detection section 452 detects differences between the speed path generated by the speed path generation section 50 and the time series data of movement states predicted by the vehicle movement prediction section 450. Depending on the detected differences, the driving support section 454 displays the differences at the display device 324 and reports the differences to the driver. Herein, the vehicle movement prediction section 450 is an example of a state prediction section.

The environmental movement detection section 40 detects a position of the driver's foot on the brake pedal and a position of the driver's foot on the accelerator pedal on the basis of outputs from a brake pedal sensor (not shown in the drawings) and an accelerator pedal sensor (not shown in the drawings). The brake pedal sensor and accelerator pedal sensor are structured using, for example, photoelectric sensors to output the positions of the driver's foot on the brake pedal and accelerator pedal.

On the basis of detected speeds of the vehicle and detection results of the position of the driver's foot on the brake pedal and the position of the driver's foot on the accelerator pedal, the vehicle movement prediction section 450 predicts a time series of data of future speeds of the vehicle.

For example, if it is detected that the driver's foot is at a position contacting the brake pedal, the vehicle movement prediction section 450 assumes that a deceleration operation is being performed and predicts a time series of data of speeds such that the vehicle decelerates at a constant deceleration from the current speed of the vehicle.

If it is detected that the driver's foot is above the brake pedal, the vehicle movement prediction section 450 assumes a state in which the driver is planning to decelerate and is ready to brake, and predicts time series data of speeds such that the vehicle will decelerate at a constant deceleration after 100 ms of free running time (after the vehicle has continued for 100 ms at the current speed).

If it is detected that the driver's foot is above the accelerator pedal, the vehicle movement prediction section 450 assumes a state in which the driver is planning to decelerate and is moving their foot away from the accelerator pedal, and predicts time series data of speeds such that the vehicle will decelerate at a constant deceleration after 200 ms of free running time (after the vehicle has continued for 200 ms at the current speed).

If it is detected that the driver's foot is at a position contacting the accelerator pedal, the vehicle movement prediction section 450 assumes that the driver is not planning to decelerate and predicts time series data of speeds such that the vehicle decelerates at a constant deceleration after 300 ms of free running time (after the vehicle has continued for 300 ms at the current speed).

Figure 19:
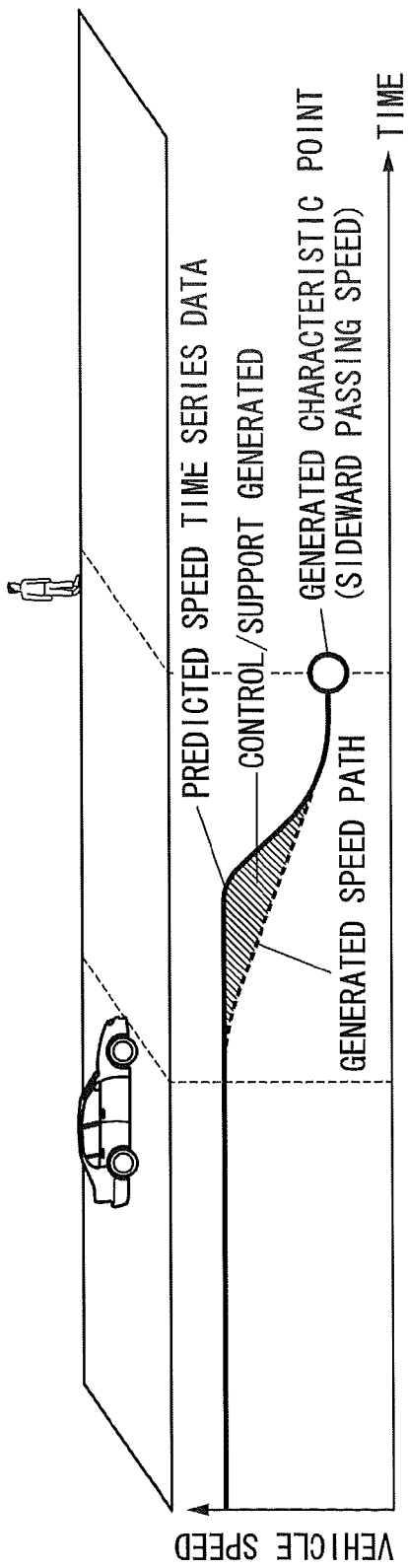
FIG. 19 is a diagram showing differences between a generated speed path and time series data of predicted speeds.

As illustrated in FIG. 19, the path difference detection section 452 detects differences between the generated speed path representing changes of speed and the predicted time series data of future speeds of the vehicle.

The driving support section 454 conducts driving support by displaying at the display device 324 pedal pressures and/or steering forces corresponding to the differences such that the detected differences can be reduced.

Figure 20:
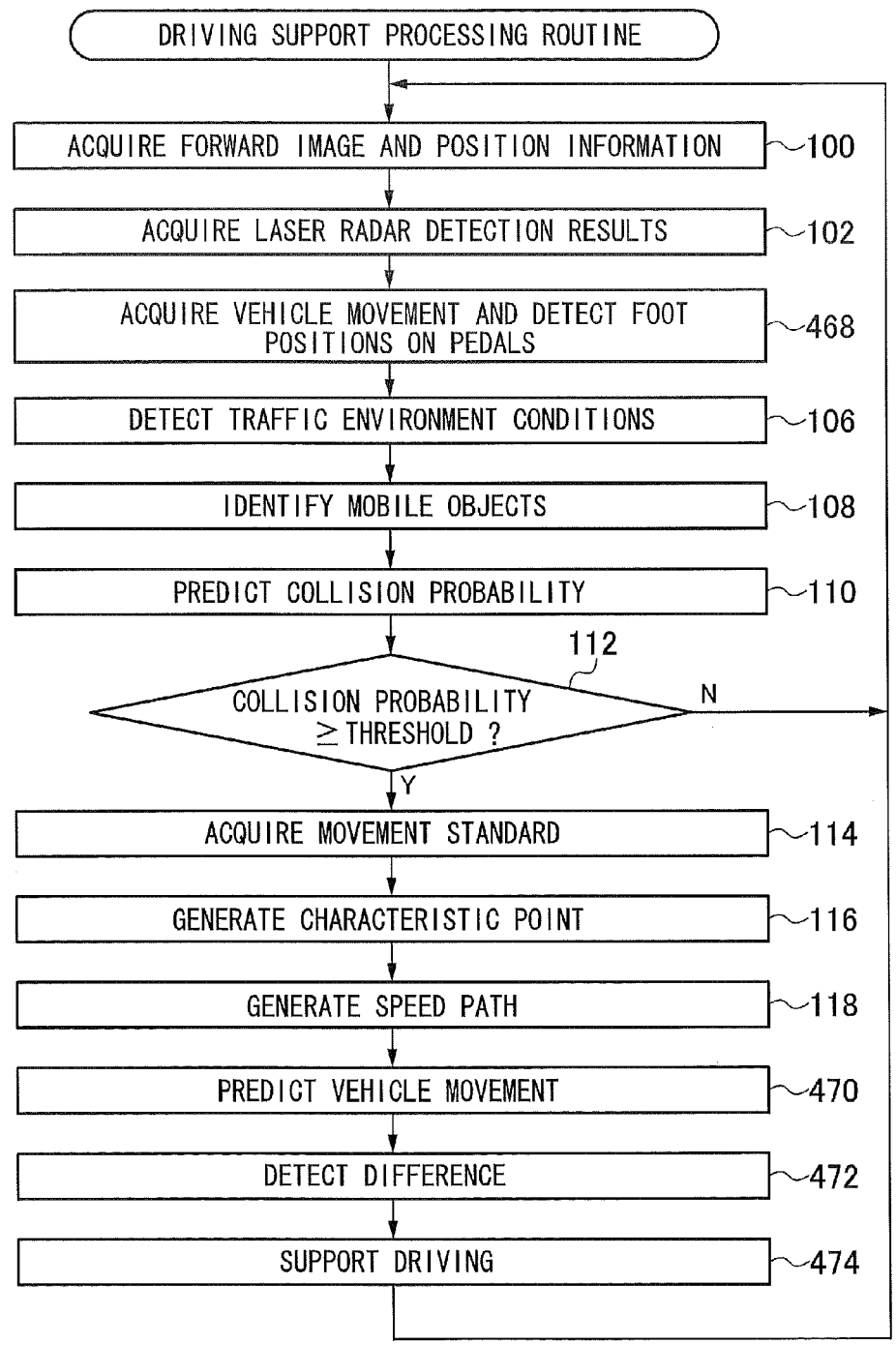
FIG. 20 is a flowchart showing the details of a driving support processing routine of a driving support device in accordance with a fourth exemplary embodiment of the present invention.

Now, a driving support processing routine according to the fourth exemplary embodiment is described using FIG. 20. Processing that is the same as in the first exemplary embodiment is assigned the same reference numerals and is not described in detail.

In step 100, the computer 422 acquires the forward image captured by the camera 18 and the vehicle position detected by the GPS device 20. In step 102, the computer 422 acquires from the laser radar 12 data representing the two-dimensional positions (measured distances to two-dimensional positions arrayed in the scanning direction) of objects disposed in front of the vehicle. In step 468, the computer 422 acquires the speed and yaw rate/acceleration detected by the movement sensor 14 to serve as the movement state of the vehicle and, on the basis of the outputs from the brake pedal sensor and the accelerator pedal sensor, the computer 422 detects a position of the driver's foot on the brake pedal and a position of the driver's foot on the accelerator pedal.

In step 106, the computer 422 detects conditions of the running environment including the areas and road attributes of various driving lanes in the vehicle's vicinity. In step 108, the computer 422 detects mobile objects in the vicinity and driving states of the mobile objects, and also identifies stationary objects and types of the mobile objects.

In step 110, on the basis of position distributions and speed distributions of the vicinity mobile objects and the position distribution and speed distribution of the vehicle, the computer 422 predicts prospective collision probabilities. In step 112, the computer 422 makes a determination as to whether a collision probability predicted in step 110 is at least a threshold value. If the collision probabilities are less than the threshold, the computer 422 returns to step 100. On the other hand, if a collision probability is at or above the threshold, in step 114, the computer 422 acquires the first-order coefficient $\alpha$ and intercept $\beta$ of the first-order linear regression corresponding to the speed (approach speed) of the vehicle detected in step 104.

In step 116, the computer 422 calculates a sideward passing speed, which is the standard for when passing the vicinity mobile object to sideward, and generates a characteristic point representing the calculated sideward passing speed. In step 118, the computer 422 generates a speed path that represents time series data of speeds smoothly joining a point representing the approach speed detected in step 104 with the characteristic point generated in step 116.

Then, in step 470, the learning data generation section 42 predicts time series data of future speeds of the vehicle on the basis of the vehicle speed and foot positions on the accelerator pedal and brake pedal detected in step 468.

In step 472, the computer 422 detects a difference between the vehicle future speed time series data predicted in step 470 and the speed path generated in step 118.

In step 474, the computer 422 displays a pedal pressure or steering force corresponding to the difference detected in step 472 at the display device 324, reporting this information to the driver. Then the computer 422 returns to step 100.

As described hereabove, the driving support device according to the fourth exemplary embodiment may provide a learning opportunity such that a driver may understand speed control in accordance with the speed path of the standard driver.

Moreover, when the generated standard speed path and the predicted vehicle speed time series data are different, the driving support device may, by reporting a pedal pressure/steering force corresponding to the difference and giving warning support, give instruction on a desirable speed path according to the movement standards.

Next, a driving support device in accordance with a fifth exemplary embodiment is described. The driving support device according to the fifth exemplary embodiment has the same structure as in the first exemplary embodiment, so the same reference numerals are assigned and descriptions of the structure are not given.

The fifth exemplary embodiment differs from the first exemplary embodiment in that respective standard paths are generated for speed and for steering angle, and respective differences from actual speeds and steering angles are detected.

In the driving support device according to the fifth exemplary embodiment, the movement sensor 14 is further equipped with a steering angle sensor that detects steering angles. The environmental movement detection section 40 acquires a steering angle of the vehicle, which is an attitude state of the vehicle, from results of detection by the movement sensor 14.

When the standard driver (for example, a skilled driver) is driving, the learning data generation section 42 acquires, from the detection results from the environmental movement detection section 40, the speed of the vehicle prior to passing a vicinity mobile object to sideward to serve as the approach speed. From the detection results from the environmental movement detection section 40, the learning data generation section 42 acquires the speed of the vehicle when passing the vicinity mobile object to sideward to serve as the sideward passing speed. The learning data generation section 42 also acquires, from the detection results from the environmental movement detection section 40, a steering angle of the vehicle to serve as an approach steering angle prior to passing the vicinity mobile object to sideward and acquires steering angles of the vehicle to serve as intermediate steering angles before the vicinity mobile object is passed to sideward.

The learning data generation section 42 also acquires, from the detection results from the environmental movement detection section 40, a position of the vehicle and a position of the vicinity mobile object and calculates a lateral direction distance between the position of the vehicle and the position of the vicinity mobile object to serve as the sideward spacing. The learning data generation section 42 further acquires a collision probability predicted by the collision probability prediction section 41 before passing the vicinity mobile object to sideward. Thus, the learning data generation section 42 generates plural sets of learning data formed of the approach speed, sideward spacing, collision probability, sideward passing speed, approach steering angle and intermediate steering angles obtained as described hereabove.

On the basis of the plural sets of generated learning data, the movement standard learning section 44 learns relationships between approach speed, collision probability and sideward passing speed, to serve as movement standards. The movement standard learning section 44 also learns, on the basis of the plural sets of generated learning data, relationships between approach steering angle, collision probability and intermediate steering angles, to serve as movement standards.

The movement standard storage section 46 memorizes a table storing, for each of respective approach speeds, the first-order coefficient $\alpha$ and intercept $\beta$ of the first-order linear regression representing the relationship between the collision probabilities and side passing speeds obtained as learning results. The movement standard storage section 46 also memorizes a table storing, for each of respective approach steering angles, a first-order coefficient $\alpha$ and intercept $\beta$ of a first-order linear regression representing a relationship between the collision probabilities and intermediate steering angles obtained as learning results.

Figure 21:
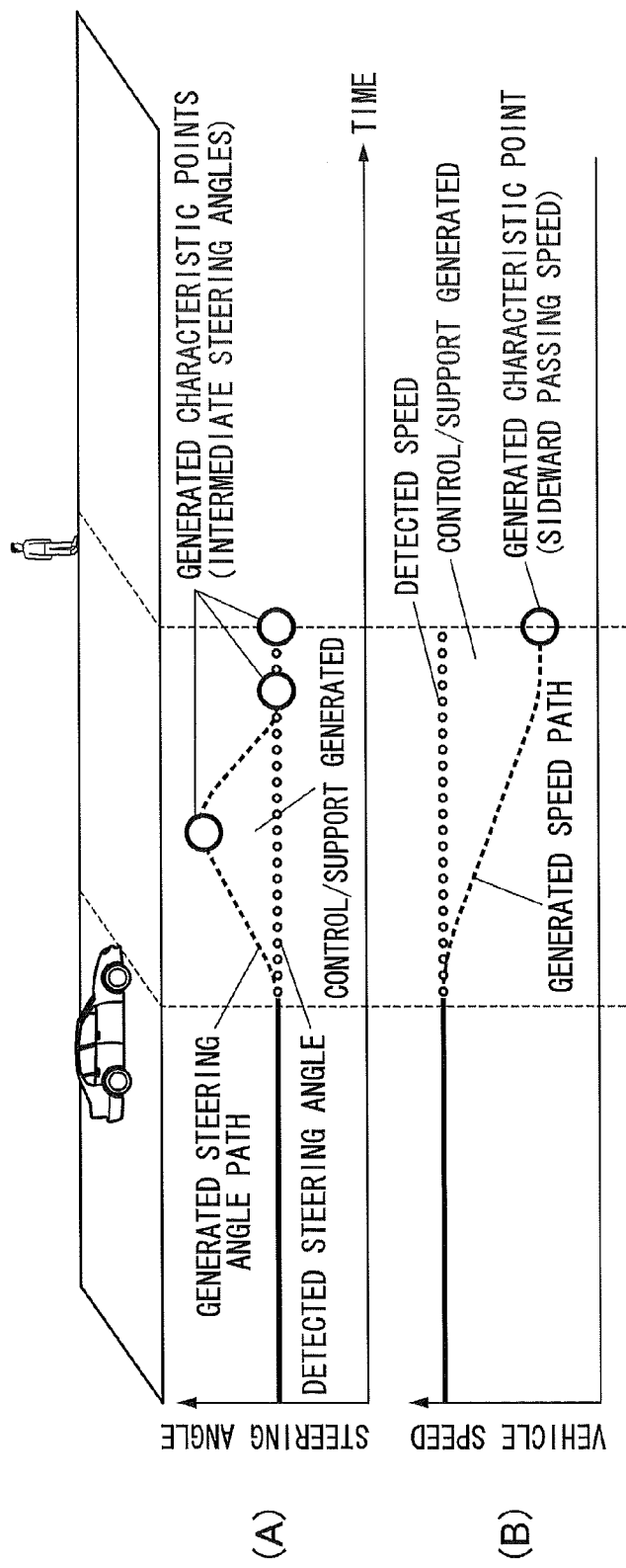
FIG. 21 is a diagram showing differences between a generated steering angle path and a detected steering angle, and differences between a generated speed path and a detected speed.

From the tables memorized at the movement standard storage section 46, the path characteristic point generation section 48 acquires the first-order coefficient $\alpha$ and intercept $\beta$ of the first-order linear regression representing the relationship between collision probability and intermediate steering angles that corresponds to the approach speed of the vehicle, and calculates intermediate steering angles corresponding to the predicted collision probability. The path characteristic point generation section 48 then generates characteristic points representing the calculated intermediate steering angles, as illustrated in FIG. 21.

The path characteristic point generation section 48 further acquires from the tables stored at the movement standard storage section 46 the first-order coefficient $\alpha$ and intercept $\beta$ of the first-order linear regression representing the relationship between collision probability and sideward passing speed that corresponds to the approach speed of the vehicle, and calculates the sideward passing speed corresponding to the predicted collision probability. The path characteristic point generation section 48 then generates a characteristic point representing the calculated sideward passing speed, as illustrated in FIG. 21.

The speed path generation section 50 generates a smooth speed path connecting the current movement state (the approach speed) with the generated characteristic point (the sideward passing speed). The speed path generation section 50 also generates a smooth steering angle path connecting the current steering angle (the approach steering angle) with the generated characteristic points (the intermediate steering angles).

Each time the speed of the vehicle is detected, the path difference detection section 52 detects a difference between the generated speed path and the detected speed of the vehicle. In addition, each time the steering angle of the vehicle is detected, the path difference detection section 52 detects a difference between the generated steering angle path and the detected steering angle of the vehicle.

On the basis of the detected differences in speed, the driving support section 54 conducts driving intervention control to control acceleration/deceleration of the vehicle so as to reduce the differences. On the basis of the detected differences in steering angle, the driving support section 54 conducts driving intervention control to control the steering angle of the vehicle so as to reduce the differences.

Other structures and operations of the driving support device according to the fifth exemplary embodiment are the same as in the first exemplary embodiment, so are not described here.

As described hereabove, the driving support device according to the fifth exemplary embodiment determines a standard sideward passing speed corresponding to a detected approach speed and a predicted prospective collision probability, on the basis of a first-order linear regression between prospective collision probabilities and sideward passing speeds when passing other mobile objects to sideward, which is learned for the respective approach speed. Thus, the driving support device may determine a standard sideward passing speed efficiently. In addition, the driving support device determines standard intermediate steering angles corresponding to a detected approach steering angle and the predicted prospective collision probability, on the basis of a first-order linear regression between prospective collision probabilities and intermediate steering angles when passing other mobile objects to sideward, which is learned for the respective approach steering angle. Thus, the driving support device may determine standard intermediate steering angles efficiently.

The technology for determining standard intermediate steering angles described in the fifth exemplary embodiment hereabove is also applicable to the above-described second to fourth exemplary embodiments.

In the first to fifth exemplary embodiments described above, cases in which determined states of the vehicle are the speed and steering angle or the like are described as examples, but this is not limiting. The driving support device may determine other physical quantities serving as states of the vehicle, such as positions of the vehicle and the like. For example, the driving support device may determine standard positions of the vehicle when passing to sideward in correspondence with positions of the vehicle while approaching and predicted collision probabilities.

A case in which the driving support device linearly predicts a position distribution of the vehicle and a position distribution of a vicinity mobile object to predict a collision probability has been described as an example, but this is not limiting. For example, the driving support device may suppose respective movement equations for the vehicle that is the main subject of processing and a detected vicinity mobile object, predict regions to which they may move in the next few seconds (for example, 5 s) by applying random numbers to control inputs, and repeat this processing a significantly large number of times (a Monte Carlo method). Then, the driving support device may use a degree of overlap between the vehicle and the vicinity mobile object to predict a collision probability. As a further example, the driving support device may generate a pre-specified number of mobile particles on a map for each of the vehicle that is the main subject of processing and a detected vicinity mobile object, repeatedly move and sample these mobile object particles, and predict regions to which the mobile objects may move in the next few seconds (for example, 5 s). Then, the driving support device may use a degree of overlap between the vehicle and the vicinity mobile object to predict a collision probability.

A case in which, in response to detected differences, the driving support device conducts driving intervention control or implements displays at a display device to support driving has been described as an example, but this is not limiting. The driving support device may both conduct driving intervention control and perform displays at a display device in accordance with detected differences. Thus, the driving support device may, with the same structure, realize both a precautionary safety system that pre-emptively prevents collisions in accordance with movement standards and a teaching system.

A case in which the driving support device reports information to a driver by displays at a display device in accordance with detected differences has been described as an example, but this is not limiting. The driving support device may report information to the driver by outputting voice messages in accordance with detected differences.

A case in which the driving support device scans to forward with a laser from a laser radar to detect positions of bodies has been described as an example, but this is not limiting. The driving support device may scan to forward with electromagnetic waves such as millimeter waves or the like to detect the positions of objects.

A case in which the driving support device detects the positions of objects in front of the vehicle with a laser radar has been described as an example, but this is not limiting. For example, the driving support device may detect the positions of objects in front of the vehicle from forward images captured by a stereo camera.

In addition, the driving support device may define blind spot regions as seen from the vehicle with a stereo technology using a camera.

A case in which the main driving subject is a driver has been described as an example, but this is not limiting. The main driving subject may be a learning-based machine. In such a case, machine learning by teaching of desirable speed paths, characteristic points and the like is possible (learning by reinforcement learning and the like).

Figure 22:
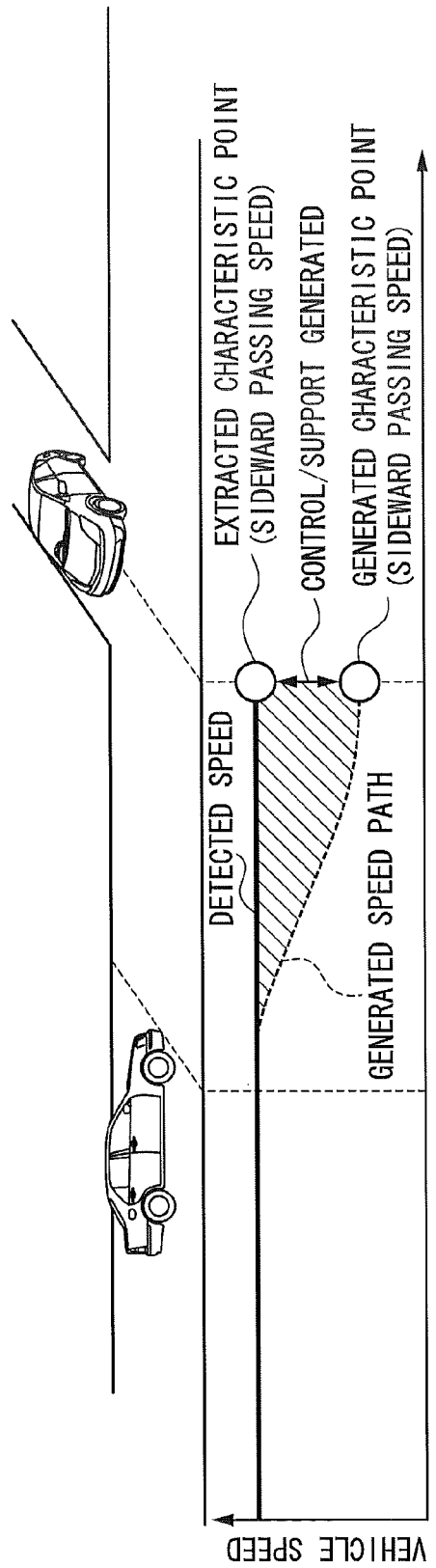
FIG. 22 is a diagram showing a difference between a generated characteristic point and a characteristic point extracted from time series data of a detected speed.
Figure 23:
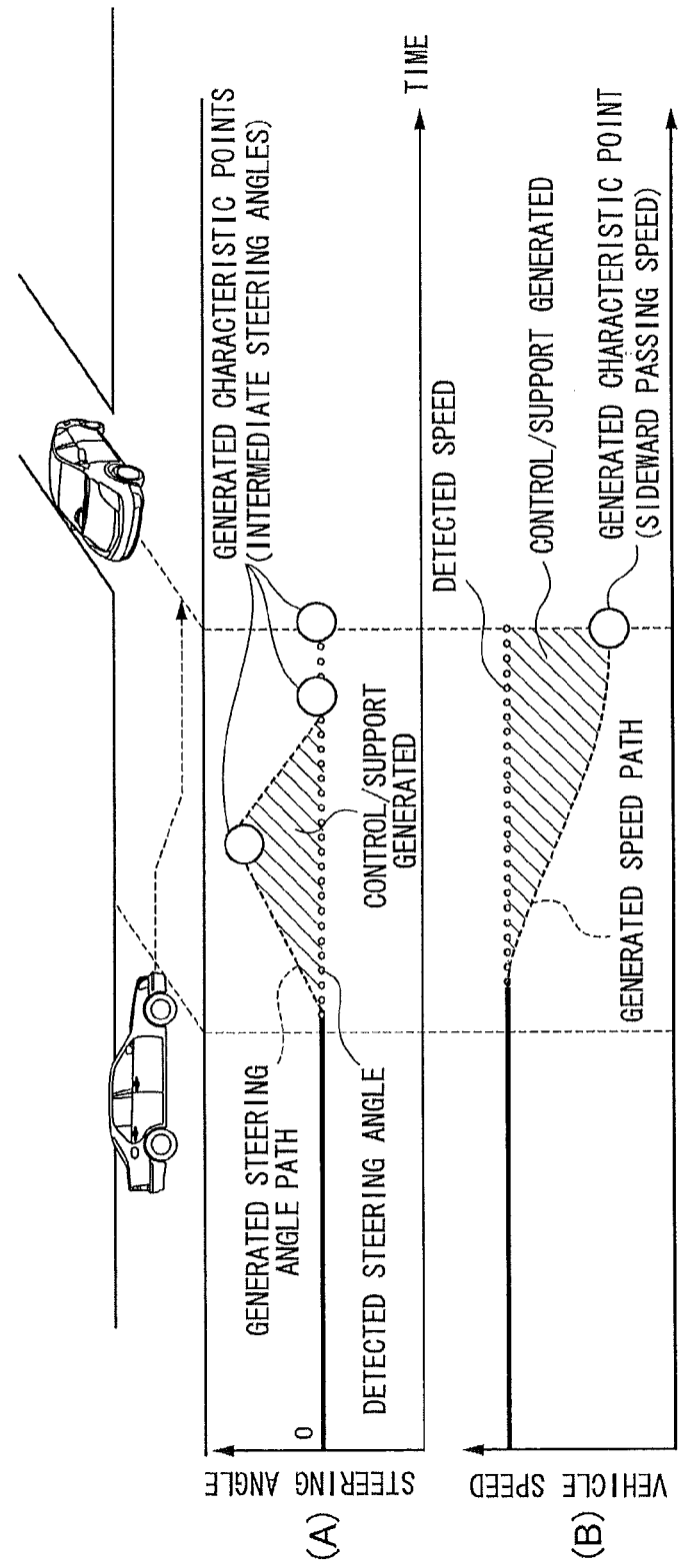
FIG. 23 is a diagram showing differences between a generated steering angle path and a detected steering angle, and a diagram showing differences between a generated speed path and a detected speed.

A case in which the driving support device determines a sideward passing speed for when passing a vicinity mobile object to sideward, which is a mobile object target state, has been described as an example, but this is not limiting. For example, as illustrated in FIG. 22, the driving support device may determine a forward passing speed for when passing to forward of a crossing vehicle whose front is encountered at an intersection (a vehicle waiting to turn left or right at the intersection). In such a case, on the basis of a table memorized at the movement standard storage section 46, the driving support device calculates a forward passing speed corresponding to a detected approach speed of the vehicle in which the driving support device is installed and a predicted collision probability and, as shown in FIG. 22, generates a characteristic point representing the calculated forward passing speed. Alternatively, the driving support device may calculate intermediate steering angles corresponding to the approach speed of the vehicle and the predicted collision probability from a table memorized at the movement standard storage section 46 and, as shown in FIG. 23, generate characteristic points representing the calculated intermediate steering angles. The driving support device also calculates a forward passing speed corresponding to the approach speed of the vehicle and the predicted collision probability from a table memorized at the movement standard storage section 46 and, as shown in FIG. 23, generates a characteristic point representing the calculated forward passing speed.

The technology described in the above exemplary embodiments may also be applied to a case of deciding a sideward passing speed for when passing a vehicle emerging from a garage to sideward.

A case in which the movement standard storage section 46 memorizes a table representing relationships between approach speeds, collision probabilities and sideward passing speeds obtained as learning results has been described as an example, but this is not limiting. The movement standard storage section 46 may memorize a table of the driving data (the approach speeds, collision probabilities and sideward passing speeds) obtained during driving by the standard driver (for example, a skilled driver).

The program of the present invention may be provided stored in a recording medium.

A computer readable medium according to the present invention stores a program for causing a computer to function as: a collision prediction section that, on the basis of a mobile object state detected by a detection section that detects a mobile object state that is at least one of a position, attitude state and movement state of a mobile object subject to a determination and that detects a mobile object in a vicinity of the determination target mobile object, predicts a prospective collision probability between the determination target mobile object and the detected vicinity mobile object; and a determination section that determines a mobile object target state corresponding to the mobile object state detected by the detection section and the collision probability predicted by the collision prediction section, on the basis of a pre-specified relationship between the mobile object state, the collision probability and the mobile object target state.

The disclosures of Japanese Patent Application No. 2010-267551 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A mobile object target state determination device comprising:
   a detection section that detects a mobile object state that is at least one of a position, attitude state and movement state of a mobile object subject to a determination, and that detects a mobile object state of a mobile object in a vicinity of the determination target mobile object;
   a collision prediction section that, on the basis of the mobile object state of the determination target mobile object and the mobile object state of the vicinity mobile object detected by the detection section, predicts a prospective collision probability between the determination target mobile object and the detected vicinity mobile object; and
   a determination section that determines a mobile object target state of the determination target mobile object corresponding to the mobile object state of the determination target mobile object detected by the detection section and the collision probability predicted by the collision prediction section, on the basis of a pre-specified relationship from which the mobile object target state, which is the mobile object state of the mobile object after the time that the mobile object state is detected, is determined by the determination section in accordance with the mobile object state of the mobile object and the collision probability predicted at the time that the mobile object state is detected.

2. The mobile object target state determination device according to claim 1, further comprising a driving support section that conducts driving support in accordance with a difference between the mobile object target state of the determination target mobile object determined by the determination section and the mobile object state of the determination target mobile object detected by the detection section.

3. The mobile object target state determination device according to claim 2, further comprising a generation section that, on the basis of the mobile object target state of the determination target mobile object determined by the determination section, generates time series data of the mobile object state up to the mobile object target state,
wherein the driving support section conducts driving support in accordance with a difference between the mobile object state time series data generated by the generation section and the mobile object state of the determination target mobile object detected by the detection section.

4. The mobile object target state determination device according to claim 2, further comprising:
a generation section that, on the basis of the mobile object target state of the determination target mobile object determined by the determination section, generates time series data of the mobile object state up to the mobile object target state; and
a state prediction section that, on the basis of the mobile object state of the determination target mobile object detected by the detection section, predicts time series data of the mobile object state of the determination target mobile object up to the mobile object target state,
wherein the driving support section conducts driving support in accordance with a difference between the mobile object state time series data generated by the generation section and the mobile object state time series data predicted by the state prediction section.

5. The mobile object target state determination device according to claim 1 wherein the mobile object target state of the determination target mobile object determined by the determination section with respect to the mobile object state of the determination target mobile object detected by the detection section and the collision probability predicted by the collision prediction section, is a standard mobile object state when passing the vicinity mobile object to sideward, forward or rearward, the mobile object target state being determined on the basis of a relationship from which the mobile object target state, which is the mobile object state when passing another mobile object to sideward, forward or rearward, is determined in accordance with the mobile object state of the mobile object and the collision probability predicted at the time that the mobile object state is detected, the relationship having been pre-specified on the basis of mobile object states of the mobile object, collision probabilities and mobile object states of the mobile object when passing other mobile objects to sideward, forward or rearward that are determined when prospective collision probabilities with the other mobile objects are predicted in standard movements of the mobile object.

6. The mobile object target state determination device according to claim 5, further comprising:
a learning data generation section that generates plural sets of learning data that are the collision probabilities predicted by the collision prediction section in the standard movements of the determination target mobile object, the mobile object states of the determination target mobile object detected by the detection section when these collision probabilities are predicted, and the mobile object states of the determination target mobile object detected by the detection section when passing the other mobile objects to sideward, forward or rearward; and
a movement standard learning section that, on the basis of the plural sets of learning data generated by the learning data generation section, learns the relationship from which the mobile object target state that is the mobile object state when passing another mobile object to sideward, forward or rearward is determined in accordance with the mobile object state of the mobile object and the collision probability predicted at the time that the mobile object state is detected in standard movements of the determination target mobile object,
wherein the mobile object target state of the determination target mobile object determined by the determination section is the standard mobile object state when passing the vicinity mobile object to sideward, forward or rearward that, on the basis of learning results at the movement standard learning section, corresponds to the mobile object state of the determination target mobile object detected by the detection section and the collision probability predicted by the collision prediction section.

7. A non-transitory computer-readable storage medium that stores a program for causing a computer to function as:
a collision prediction section that, on the basis of a mobile object state of a mobile object subject to a determination and a mobile object state of a mobile object in a vicinity of the determination target mobile object, which are detected by a detection section that detects a mobile object state that is at least one of a position, attitude state and movement state of the determination target mobile object and that detects the mobile object state of the vicinity mobile object, predicts a prospective collision probability between the determination target mobile object and the detected vicinity mobile object; and
a determination section that determines a mobile object target state of the determination target mobile object with respect to the mobile object state of the determination target mobile object detected by the detection section and the collision probability predicted by the collision prediction section, on the basis of a pre-specified relationship from which the mobile object state of the mobile object after the time that the mobile object state is detected, is determined in accordance with the mobile object state of the mobile object and the collision probability predicted at the time that the mobile object state is detected.

8. A mobile object target state determination device comprising:
a detection means that detects a mobile object state that is at least one of a position, attitude state and movement state of a mobile object subject to a determination, and that detects a mobile object state of a mobile object in a vicinity of the determination target mobile object;
a collision prediction means that, on the basis of the mobile object state of the determination target mobile object and the mobile object state of the vicinity mobile object detected by the detection means, predicts a prospective collision probability between the determination target mobile object and the detected vicinity mobile object; and
a determination means that determines a mobile object target state of the determination target mobile object corresponding to the mobile object state of the determination target mobile object detected by the detection means and the collision probability predicted by the collision prediction means, on the basis of a pre-specified relationship from which the mobile object target state, which is the mobile object state of the mobile object after the time that the mobile object state is detected, is determined by the determination means in accordance with the mobile object state of the mobile object and the collision probability predicted at the time that the mobile object state is detected.

* * * * *

UNITED STATES PATENT AND TRADEMARK OFFICE
CERTIFICATE OF CORRECTION

| | | |
|---|---|---|
| PATENT NO. | : 9,132,775 B2 | Page 1 of 1 |
| APPLICATION NO. | : 13/990608 | |
| DATED | : September 15, 2015 | |
| INVENTOR(S) | : Y. Ohama | |

It is certified that error appears in the above-identified patent and that said Letters Patent is hereby corrected as shown below:

In the Claims:

At column 21, line 40, claim 5, change "according to claim 1 wherein" to -- according to claim 1, wherein --.

Signed and Sealed this
Twenty-third Day of August, 2016

Michelle K. Lee
*Director of the United States Patent and Trademark Office*